(12) United States Patent
Schimke et al.

(10) Patent No.: US 12,709,153 B2
(45) Date of Patent: Aug. 18, 2026

(54) VEHICLE WITH E-AXLE

(71) Applicant: Oshkosh Corporation, Oshkosh, WI (US)

(72) Inventors: Martin J. Schimke, Red Granite, WI (US); Andrew Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 450 days.

(21) Appl. No.: 18/237,236

(22) Filed: Aug. 23, 2023

(65) Prior Publication Data

US 2024/0066981 A1 Feb. 29, 2024

Related U.S. Application Data

(60) Provisional application No. 63/401,839, filed on Aug. 29, 2022.

(51) Int. Cl.

| | |
|---|---|
| ***B60K 17/36*** | (2006.01) |
| ***B60K 1/02*** | (2006.01) |
| ***B60K 17/02*** | (2006.01) |
| ***B60K 17/16*** | (2006.01) |
| ***B60K 17/348*** | (2006.01) |
| ***B60K 17/356*** | (2006.01) |
| ***F16H 37/08*** | (2006.01) |
| ***F16H 61/682*** | (2006.01) |
| ***F16H 63/32*** | (2006.01) |

(52) U.S. Cl.

CPC ................ *B60K 17/36* (2013.01); *B60K 1/02* (2013.01); *B60K 17/02* (2013.01); *B60K 17/165* (2013.01); *B60K 17/348* (2013.01); *B60K 17/356* (2013.01); *F16H 37/0806* (2013.01); *F16H 61/682* (2013.01); *F16H 63/32* (2013.01)

(58) Field of Classification Search

CPC .......... B60K 17/36; B60K 1/02; B60K 17/02; B60K 17/165; B60K 17/348; B60K 17/356; F16H 37/0806; F16H 61/682; F16H 63/32

See application file for complete search history.

(56) References Cited

U.S. PATENT DOCUMENTS

| | | | | |
|---|---|---|---|---|
| 5,285,866 A * | 2/1994 | Ackroyd | ................ | B62D 11/10 180/24.09 |
| 7,294,082 B2 * | 11/2007 | Lim | ....................... | B62D 7/142 475/221 |
| 8,573,348 B2 * | 11/2013 | Cantemir | .............. | B62D 7/142 180/65.245 |
| 9,493,093 B2 | 11/2016 | Stingle et al. | | |
| 10,953,939 B2 | 3/2021 | Zuleger et al. | | |
| 11,186,008 B2 | 11/2021 | Steffens et al. | | |
| 11,186,009 B2 | 11/2021 | Bjornstad et al. | | |
| 11,186,010 B2 | 11/2021 | Andringa et al. | | |

(Continued)

*Primary Examiner* — Toan C To

(74) *Attorney, Agent, or Firm* — Foley & Lardner LLP

(57) ABSTRACT

A vehicle includes a chassis and an electric axle assembly coupled to the chassis. The electric axle assembly includes a first electric motor, a second electric motor, a drive differential configured to combine a first input torque from the first electric motor and a second input torque from the second electric motor and to drive an output shaft using the combined torque, and a first axle coupled to a first tractive element configured to be driven by the output shaft to propel the vehicle.

19 Claims, 19 Drawing Sheets

(56) References Cited

U.S. PATENT DOCUMENTS

| | | | | |
|---|---|---|---|---|
| 11,187,138 | B2 | 11/2021 | Steffens et al. | |
| 11,680,639 | B1 * | 6/2023 | Godo | B60K 1/02 477/3 |
| 11,850,946 | B2 * | 12/2023 | David | B60K 17/02 |
| 12,179,571 | B2 * | 12/2024 | Barillot | B60K 25/02 |
| 2011/0036658 | A1 * | 2/2011 | Cantemir | B60K 6/547 180/65.245 |
| 2021/0171137 | A1 | 6/2021 | Zuleger et al. | |
| 2021/0354329 | A1 | 11/2021 | Hou et al. | |
| 2022/0072736 | A1 | 3/2022 | Steffens et al. | |
| 2022/0118854 | A1 | 4/2022 | Davis et al. | |
| 2022/0134372 | A1 | 5/2022 | Andringa | |
| 2022/0134856 | A1 | 5/2022 | Andringa et al. | |
| 2024/0034157 | A1 * | 2/2024 | Godo | B60L 50/60 |
| 2024/0109425 | A1 * | 4/2024 | Brolles | B60K 17/22 |
| 2024/0343113 | A1 * | 10/2024 | Houser | B60K 17/36 |

* cited by examiner 1200
1210
1204
600
1202
1220

VEHICLE WITH E-AXLE

CROSS-REFERENCE TO RELATED PATENT APPLICATION

This application claims the benefit of and priority to U.S. Provisional Patent Application No. 63/401,839, filed on Aug. 29, 2022, the entirety of which is hereby incorporated by reference herein.

BACKGROUND

Vehicles typically include one or more axles that can be coupled between a prime mover and one or more wheels.

SUMMARY OF THE INVENTION

One exemplary embodiment relates to a method of shifting gears in a vehicle having a first electric traction motor coupled to a first gear assembly and a second electric traction motor coupled to a second gear assembly. The method includes simultaneously operating the first electric traction motor to supply a first amount of power to the first gear assembly and operating the second electric traction motor to supply the first amount of power to the second gear assembly, simultaneously operating the first electric traction motor to stop supplying power and operating the second electric traction motor to supply twice the first amount of power, shifting the first gear assembly from a first gear configuration to a second gear configuration, simultaneously operating the second electric traction motor to stop supplying power and operating the first electric traction motor to supply twice the first amount of power, shifting the second gear assembly from the first gear configuration to the second gear configuration, and simultaneously operating the first electric traction motor to supply a second amount of power to the first gear assembly and operating the second electric traction motor to supply the second amount of power to the second gear assembly.

Another exemplary embodiment relates to a method of shifting gears in a vehicle having a first electric traction motor coupled to a first gear assembly and a second electric traction motor coupled to a second gear assembly. The method includes simultaneously operating the first electric traction motor to supply a first amount of power to the first gear assembly and operating the second electric traction motor to supply a second amount of power to the second gear assembly, simultaneously operating the first electric traction motor to stop supplying power and operating the second electric traction motor to supply a third amount of power, the third amount of power being higher than the second amount of power, shifting the first gear assembly from a first gear configuration to a second gear configuration, simultaneously operating the second electric traction motor to stop supplying power and operating the first electric traction motor to supply a fourth amount of power, the fourth amount of power being greater than the first amount of power, shifting the second gear assembly from a third gear configuration to a fourth gear configuration, and simultaneously operating the first electric traction motor to supply a fifth amount of power to the first gear assembly and operating the second electric traction motor to supply a sixth amount of power to the second gear assembly.

Another exemplary embodiment relates to a vehicle including a chassis and an electric axle coupled to the chassis. The electric axle includes a first electric motor, a second electric motor, a drive differential configured to combine a first input torque from the first electric motor and a second input torque from the second electric motor and to drive an output shaft using the combined torque, and a first tractive element configured to be driven by the output shaft to propel the vehicle.

Another exemplary embodiment relates to a vehicle including a chassis and an electric axle assembly coupled to the chassis. The electric axle assembly includes a first electric motor, a second electric motor, a drive differential configured to combine a first input torque from the first electric motor and a second input torque from the second electric motor and to drive an output shaft using the combined torque, and a first axle coupled to a first tractive element configured to be driven by the output shaft to propel the vehicle.

Another exemplary embodiment relates to a method of shifting gears in a vehicle having a first electric traction motor coupled to a first gear assembly and a second electric traction motor coupled to a second gear assembly. The method include simultaneously operating the first electric traction motor to supply a first amount of power to the first gear assembly and operating the second electric traction motor to supply a second amount of power to the second gear assembly and simultaneously operating the first electric traction motor to stop supplying power and operating the second electric traction motor to supply a third amount of power, the third amount of power being higher than the second amount of power. The method further includes, while the first electric traction motor is not supplying power, shifting the first gear assembly from a first gear configuration to a second gear configuration, simultaneously operating the second electric traction motor to stop supplying power and operating the first electric traction motor to supply a fourth amount of power, the fourth amount of power being greater than the first amount of power, and, while the second electric traction motor is not supplying power, shifting the second gear assembly from a third gear configuration to a fourth gear configuration.

Another exemplary embodiment relates to a vehicle including a chassis and an electric axle assembly coupled to the chassis. The electric axle assembly includes an axle including a first tractive element on a first side of the chassis and a second tractive element on a second side of the chassis, a first electric motor configured to drive a first output gear, a second electric motor configured to drive a second output gear, a drive differential including a spider gear configured to be driven by the first output gear and the second output gear, the spider gear coupled to and configured to drive a ring gear using a combined output torque from the first output gear and the second output gear, and an axle differential configured to receive the combined output torque from the ring gear and to divide the combined output torque to drive the first tractive element and the second tractive element.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the Figures, which illustrate the exemplary embodiments in detail, it should be understood that the present application is not limited to the details or methodology set forth in the description or illustrated in the Figures. It should also be understood that the terminology is for the purpose of description only and should not be regarded as limiting.

Referring generally to the Figures, systems and methods for driving a vehicle (e.g., a commercial vehicle) are shown. In some embodiments, vehicles include one or more electric axles or electronic axles (i.e., E-axles) that include an electric motor configured to produce mechanical energy, typically for the purposes of driving tractive elements or driveshafts to propel the vehicle. Large commercial vehicles like garbage trucks and tractor units often require a large amount of power and torque to accelerate due to the weight of the vehicle and its load. In some embodiments, multiple electric motors are configured to drive a single axle of a vehicle to provide additional power. Additionally, while the motors of electric cars are often directly connected to the drive wheels, without a transmission gearbox, commercial vehicles may require gearing to generate higher torque for low-range acceleration. In some embodiments, methods are provided to allow a vehicle to accelerate while allowing smooth transitions between gears. In some embodiments, the gears used for low-range acceleration can be disconnected from the drivetrain entirely when the vehicle is driven at higher speeds, in order to improve efficiency.

Commercial Vehicle

Figure 1:
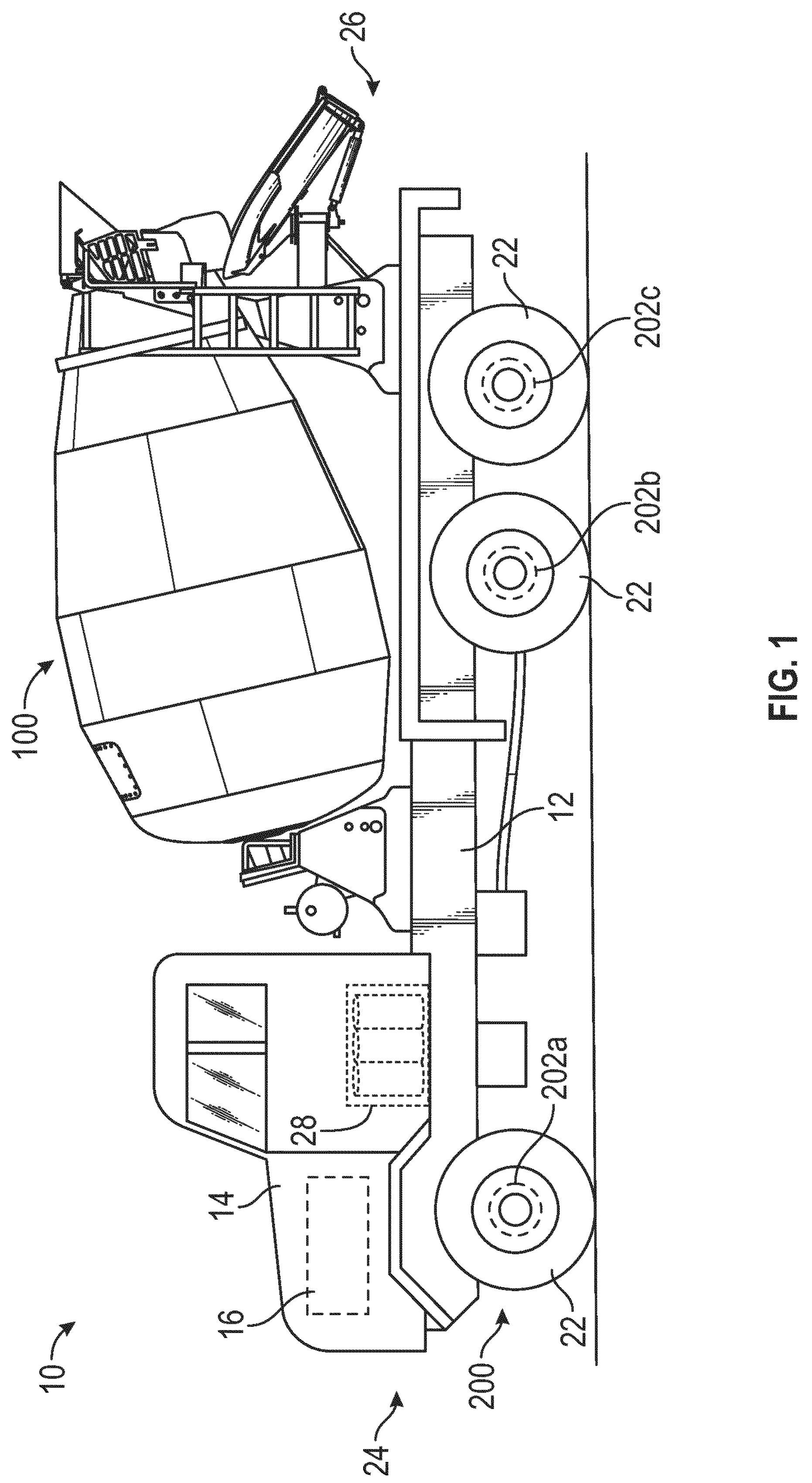
FIG. 1 is side view of a commercial vehicle including an electric drivetrain, according to some embodiments.

According to the exemplary embodiment shown in FIG. 1, a vehicle (e.g., a commercial vehicle, a refuse vehicle, a fire fighting vehicle, a fire suppression vehicle, a military vehicle, etc.), shown as commercial vehicle 10, includes an accessory feature or accessory, shown as drum assembly 100. According to an exemplary embodiment, the commercial vehicle 10 is configured as a rear-discharge concrete mixer truck. In other embodiments, the commercial vehicle 10 may be configured as a front-discharge concrete mixer truck. In other embodiments, the commercial vehicle 10 may be a fire fighting vehicle, a refuse vehicle, a transport vehicle, a military vehicle, etc., or any other type of vehicle. As shown in FIG. 1, the commercial vehicle 10 includes a chassis (e.g., a frame member, a support member, a structural member, etc.), shown as frame 12, and a cab, shown as cab 14, coupled to the frame 12 (e.g., at a front end thereof, etc.). The drum assembly 100 is coupled to the frame 12 and disposed behind the cab 14 (e.g., at a rear end thereof), according to the exemplary embodiment shown in FIG. 1. In other embodiments, at least a portion of the drum assembly 100 may extend in front of the cab 14. The cab 14 may include various components to facilitate operation of the commercial vehicle 10 by an operator (e.g., a seat, a steering wheel, hydraulic controls, a user interface, switches, buttons, dials, etc.).

As shown in FIG. 1, the commercial vehicle 10 includes a prime mover, shown as engine 16, according to an exemplary embodiment. As shown in FIG. 1, the engine 16 is coupled to the frame 12 at a position beneath the cab 14. The engine 16 may be configured to utilize one or more of a variety of fuels (e.g., gasoline, diesel, bio-diesel, ethanol, natural gas, etc.), according to various exemplary embodiments. According to other embodiments, the prime mover additionally or alternatively includes one or more electric motors and/or generators, which may be coupled to the frame 12 (e.g., the vehicle 10 may be a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the commercial vehicle 10. In some embodiments, the commercial vehicle 10 may not include the engine 16 (e.g., the engine 16 is optional). In some embodiments, the engine 16 may be replaced by an electric motor.

As shown in FIG. 1, the commercial vehicle 10 includes a plurality of tractive elements, shown as wheels 22, that engage a ground surface to support and move (e.g., propel) the commercial vehicle 10. In one embodiment, at least a portion of the mechanical power produced by the engine 16 flows through a transmission to power at least a portion of the wheels 22 (e.g., front wheels, rear wheels, etc.). In one embodiment, energy (e.g., mechanical energy, etc.) flows along a first power path defined from the engine 16, through the transmission, and to the wheels 22.

Referring still to FIG. 1, commercial vehicle 10 includes a drivetrain 200 (e.g., a chassis assembly, a frame assembly, a drive system, etc.). The drivetrain 200 includes a front axle 202a, a first rear axle 202b, and a second rear axle 202c. In some embodiments, the front axle 202a, the first rear axle 202b, and the second rear axle 202c are rotatably coupled with corresponding pairs of wheels 22. Thus, the commercial vehicle 10 may be a six-wheeled or three-axle commercial vehicle. In some embodiments, the front axle 202a, the first rear axle 202b, and/or the second rear axle 202c are each electric axles (e.g., electric axle assemblies) that include one or more corresponding electric motors configured to produce mechanical energy to drive the corresponding pairs of wheels 22. In some embodiments, the first rear axle 202b and the second rear axle 202c form a tandem axle assembly at a rear 26 (e.g., a rear end portion) of the commercial vehicle 10. The front axle 202a may be positioned at a front 24 of the commercial vehicle 10. The front axle 202a, the first rear axle 202b, and the second rear axle 202c may each be fixedly coupled with the frame 12 and facilitate supporting the commercial vehicle 10. In some embodiments, the front axle 202a, the first rear axle 202b, and/or the second rear axle 202 are not electric axles.

The commercial vehicle 10 can include an electrical energy storage device 28 (e.g., a battery, a capacitor, etc.) that is configured to store electrical energy for one or more of the axles 202, or for one or more of the electric motors of the axles 202. In some embodiments, the one or more axles 202 are configured to consume electrical energy from the electrical energy storage device 28 to drive (e.g., propel) the commercial vehicle 10 and/or to drive an accessory of the commercial vehicle 10.

The commercial vehicle 10 may include a variety of different accessories. In some embodiments, the accessories are configured to receive a mechanical energy input (e.g., a rotational mechanical energy input) and provide some functionality in response to receiving the mechanical energy input. Accordingly, the accessories may be examples of rotary assemblies that receive a rotational mechanical energy input and provide some functionality in response to receiving the rotational mechanical energy input. By way of example, the accessories may include a pump that provides a flow of pressurized fluid. In some such examples, the pressurized fluid is a hydraulic oil that is supplied to one or more actuators (e.g., pumps, cylinders, etc.) that cause motion (e.g., linear motion, rotational motion, etc.) of one or more components of the commercial vehicle 10 (e.g., the drum assembly 100). In other such examples, the pressurized fluid is water or another fluid, such as a firefighting foam, that is transported or sprayed by the commercial vehicle 10. By way of another example, the accessories may include a compressor that is configured to provide a flow of pressurized gas. By way of example, the compressor may be an air compressor that supplies compressed air to a continuous tire inflation system that maintains a desired air pressure within the wheels 22. By way of another example, the accessories may include one or more generators (e.g., alternators, motor/generators) that are configured to receive the mechanical energy input and provide an electrical energy output. In some embodiments, the generator may provide electrical energy that is conditioned differently than the electrical energy provided by the electrical energy storage device 28 (e.g., alternating current versus direct current, at a different voltage, frequency, and/or current. etc.). By way of another example, the accessories may include one or more actuators (e.g., wheels, conveyors, levers, etc.) that convert the mechanical energy input into a mechanical movement to perform a desired function (e.g., moving material or a portion of the commercial vehicle 10). In one such embodiment, the accessories include the drum assembly 100. In some embodiments, the accessories perform functions of the commercial vehicle 10 other than propelling the commercial vehicle 10 (e.g., the accessories do not propel the commercial vehicle).

Drive Train

Figure 2:
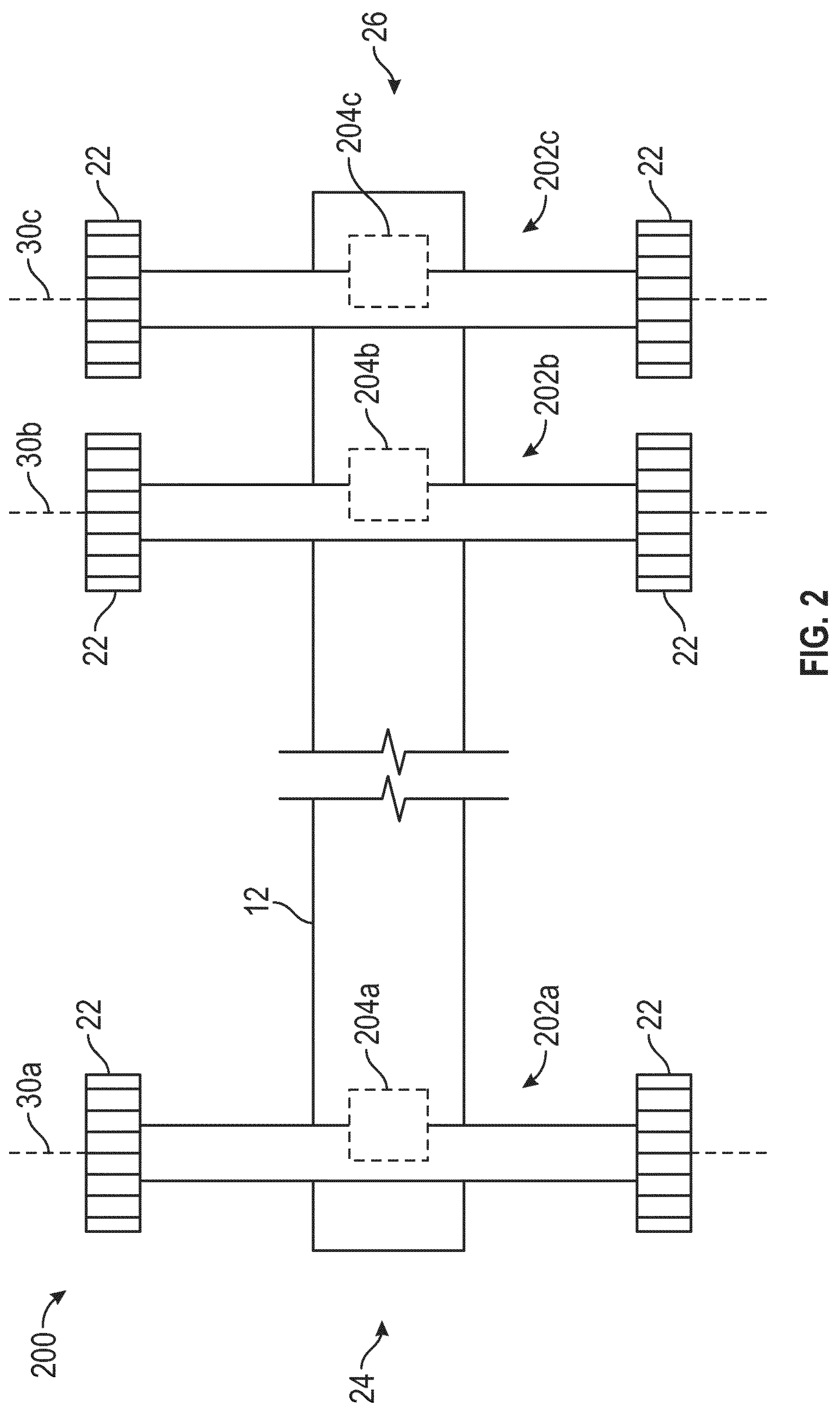
FIG. 2 is a schematic diagram of the electric drivetrain of the commercial vehicle of FIG. 1 including at least one electric axle, according to some embodiments.

Referring now to FIG. 2, a drivetrain 200 is shown, according to an exemplary embodiment. The drivetrain 200 includes the front axle 202a, the first rear axle 202b, and the second rear axle 202c. In some embodiments, both the first rear axle 202b and the second rear axle 202c are positioned at the rear 26 of the frame 12. The front axle 202a is positioned at the front 24 of the frame 12. The first rear axle 202b and the second rear axle 202c form a tandem at the rear 26 of the frame 12. It should be understood that while the drivetrain 200 as described herein is a rear-tandem drivetrain (including a pair of axles 202 at the rear, with a single axle in the front), drivetrain 200 may be similarly configured as a front-tandem drivetrain (including a pair of axles 202 at the front, and a single axle at the rear). In other embodiments, the drivetrain 200 is configured with three axles spaced equally apart along the frame 12. In some embodiments, the drivetrain 200 includes more than three axles 202. In some embodiments, at least two of the axles 202 are electric axles including an electric motor that is configured to consume electrical energy provided by the electrical energy storage device 28. In other embodiments, only one of the axles 202 is an electric axle.

As shown in FIG. 2, each of the axles 202 may include an electric motor 204 (e.g., a motor/generator, an electromagnetic device, etc.) that is configured to consume electrical energy from the electrical energy storage device 28 and generate (e.g., provide) mechanical power (e.g., rotational mechanical energy) using the electrical energy. In other embodiments, the axles 202 may include multiple electric motors 204 (e.g., two or more). Accordingly, any embodiment described herein as including a single electric motor may include multiple electric motors operating cooperatively (e.g., multiple electric motors with output shafts coupled to one another or coupled to a common output shaft). Each of the axles 202 is rotatably coupled with a pair of wheels 22. In some embodiments, the wheels 22 are configured to rotate about a corresponding axis 30 that is defined by the corresponding axle 202. For example, the front axle 202a may define an axis 30a about which the wheels 22 of front axle 202a rotate, the first rear axle 202b may define an axis 30b about which the wheels 22 of the first rear axle 202b rotate, and the second rear axle 202c may define an axis 30c about which the wheels 22 of the second rear axle 202c rotate.

The front axle 202a may be an electric axle, and may include an electric motor 204a that drives the wheels 22 of the front axle 202a to propel the commercial vehicle 10. In other embodiments, the front axle 202a does not include the electric motor 204a, and the wheels 22 rotate about the axis 30a in response to transportation of the commercial vehicle 10 (e.g., due to engagement between the wheels 22 and a ground surface) and/or in response to being driven by another electric motor. Similarly, the first rear axle 202b and/or the second rear axle 202c may be electric axles. The first rear axle 202b may include the electric motor 204b, and the second rear axle 202c may include the electric motor 204c. The electric motor 204b is configured to generate mechanical energy that can be transferred through the axle 202b to drive the wheels 22 about the axis 30b. Similarly, the electric motor 204c is configured to generate mechanical energy that can be transferred through the axle 202c to drive the wheels 22 about the axis 30c. In some embodiments, the electric motors 204 are configured to perform regenerative braking by receiving rotational mechanical energy from the wheels 22, generating electrical energy, and providing the electrical energy to the energy storage device 28. In other embodiments, the first rear axle 202*b* does not include the electric motor 204*b* and/or the second rear axle 202*c* does not include the electric motor 204*c*. In such embodiments, the wheels 22 rotate about the axis 30*b* and/or the axis 30*c* in response to transportation of commercial vehicle 10 (e.g., due to engagement between wheels 22 and a ground surface) and/or in response to being driven by another electric motor. In some embodiments, one electric motor 204*b*, 204*c* may be configured to drive both of the rear axles 202*b*, 202*c*. For example, the electric motor 204*b* may be configured to drive both the first rear axle 202*b* and the second rear axle 202*c* via an additional output shaft (e.g., a driveshaft). In some embodiments, a single electric motor 204*a*, 204*b*, 204*c* may be configured to drive all of the axles 202*a*, 202*b*, 202*c* using additional output shafts. As described above, two or more electric motors can be used together in place of any of the electric motors 204*a*, 204*b*, 204*c* to provide additional power.

In this way, the front axle 202*a*, the first rear axle 202*b*, and/or the second rear axle 202*c* may be configured to drive and/or brake the commercial vehicle 10 for transportation. In some embodiments, only one of the first rear axle 202*b* and the second rear axle 202*c* is required to operate using its corresponding electric motor 204 to drive commercial vehicle 10 for transportation. For example, the electric motor 204*b* may selectively disengage (e.g., transition into a neutral setting) so that commercial vehicle 10 is only driven to transport by second rear axle 202*c* (e.g., by driving the corresponding set or pair of wheels 22 about axis 30*c*).

Drive Configurations

Figure 3:
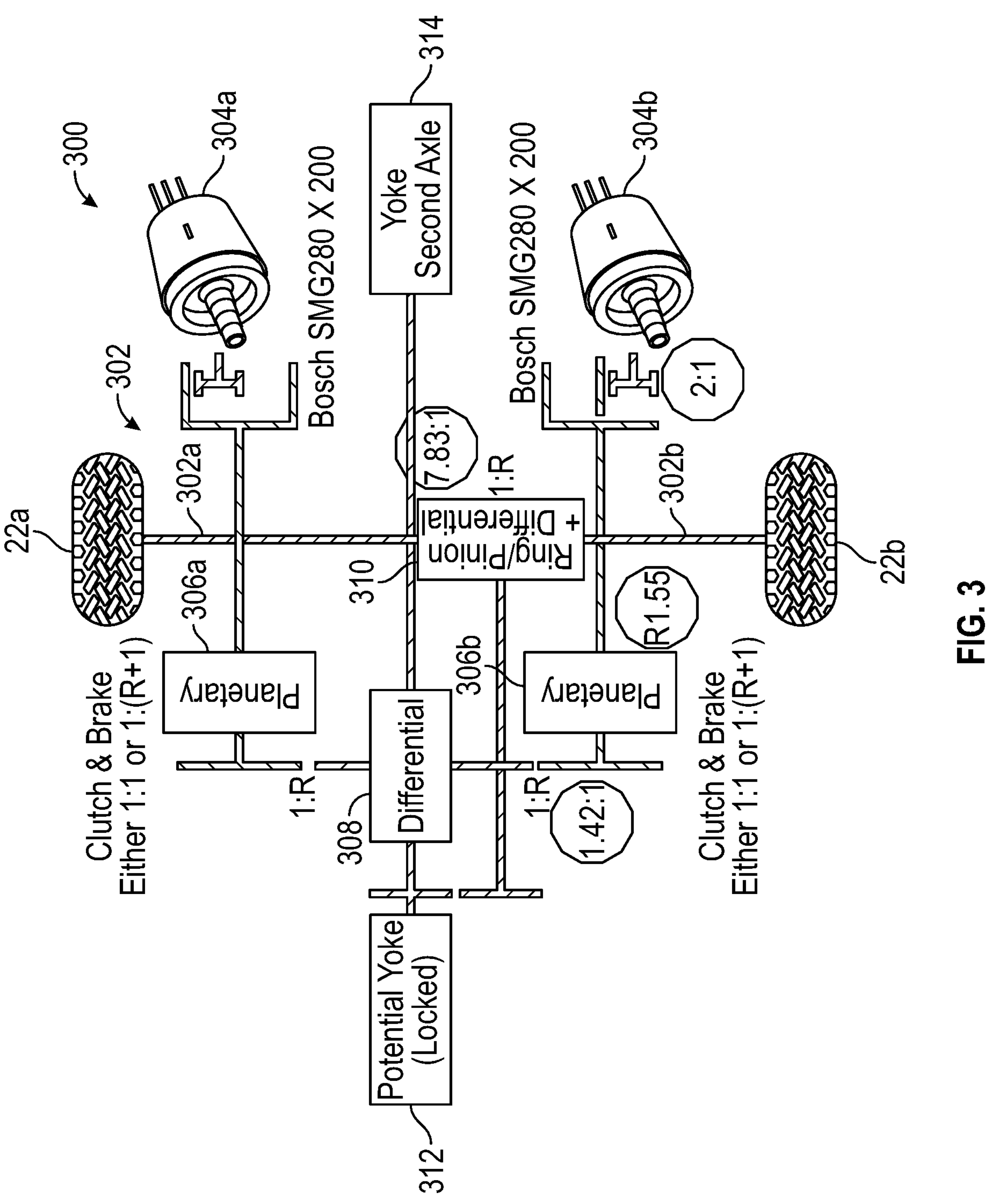
FIG. 3 is a schematic diagram of the electric axle of the commercial vehicle of FIG. 1, according to some embodiments.

Referring now to FIG. 3, a schematic diagram of an electric axle 300 (e.g., an electric axle assembly, a drive assembly, a drivetrain, etc.) is shown, according to some embodiments. In some embodiments, the electric axle 300 is the same as or similar to any of the front axle 202*a*, the first rear axle 202*b*, or the second rear axle 202*c*. For example, the first rear axle 202*b* and the second rear axle 202*c* may be electric axles 300 that include electric motors for independently driving tractive elements (e.g., wheels) and/or an accessory of the commercial vehicle 10.

Referring still to FIG. 3, the electric axle 300 includes an axle 302 including a first half-axle 302*a* coupled to a first wheel 22*a* and a second half-axle 302*b* coupled to a second wheel 22*b*, two electric motors 304*a*, 304*b* (e.g., similar to the electric motor 204), a gear assembly 306*a*, 306*b*, coupled to each electric motor 304*a*, 304*b*, a drive differential 308 coupled to both gear assembly 306*a*, 306*b*, and an axle differential 310. In some embodiments, the electric axle 300 may include a first yoke 312 that may be coupled to a driveshaft to drive the wheels 22 of another axle (e.g., the front axle 202*a*) and a second yoke 314 that may be coupled to a driveshaft to drive the wheels of another axle (e.g., the second rear axle 202*c*). The first yoke 312 may be driven by the electric motors 304*a*, 304*b* via the drive differential 308.

According to some embodiments, an output shaft of the electric motor 304*a* is rotatably coupled to an input member (e.g., a gear, a shaft, etc.) of the gear assembly 306*a*, and an output shaft of the electric motor 304*b* is rotatably coupled to an input member (e.g., a gear, a shaft, etc.) of the gear assembly 306*b*. An output member (e.g., a gear, a shaft, etc.) of each gear assembly 306*a*, 306*b* may be rotatably coupled to an input member (e.g., a gear, a shaft, etc.) of the drive differential 308. An output member (e.g., a gear, a shaft, etc.) of the drive differential 308 may be rotatably coupled to an input member (e.g., a gear, a shaft, a pinion etc.) of the axle differential 310. An output member (e.g., a gear, a shaft, etc.) of the axle differential 310 may be rotatably coupled to an input member (e.g., a gear, a shaft, a pinion etc.) of each of the half-axles 302*a*, 302*b*. Thus, the rotational output provided by the electric motors 304*a*, 304*b* may be combined by the drive differential 308 and then split by the axle differential 310 between the first half-axle 302*a* the second half-axle 302*b*. The drive differential 308 may allow each electric motor 304*a*, 304*b* to operate at different speeds while still supplying power from both motors to the axle 302. The drive differential 308 may essentially operate in a manner opposite of that of a traditional automobile differential. Rather than converting one input into two outputs (e.g., a driveshaft input and two half-axle outputs), the drive differential 308 receives two inputs (e.g., from the electric motors 304*a*, 304*b*) and combines the input torque into a single output torque which is delivered to the axle differential 310. The drive differential 308 may include additional output members (e.g., shafts, gears, etc.) which may be rotatably coupled to yokes 312, 314. The axle differential 310 may function as a traditional automobile differential by splitting the input torque between the first half-axle 302*a* and the second half-axle 302*b*. The axle differential 310 may allow the first half-axle 302*a* to rotate at a different speed than the second half-axle 302*b*. For example, when the commercial vehicle 10 makes a right turn, the left wheel 22*b* (and therefore the left half-axle 302*b*) may rotate faster than the right wheel 22*a* (and the left half-axle 302*a*). The drive differential 308 and the axle differential 310 allow both electric motors 304*a*, 304*b* to supply torque to the axle 302. In some embodiments, all of the torque supplied by both electric motors 304*a*, 304*b* can be supplied to one of the half-axles 312*a*, 312*b*, with no torque being supplied to the other half-axle 312*a*, 312*b*. In some embodiments, when the axle 302 is coupled to a second axle (e.g., in a tandem axle assembly), all of the torque can be supplied to half axles on one side of the vehicle 10, with no torque being supplied to half-axles on the other side of the vehicle 10.

Figure 4:
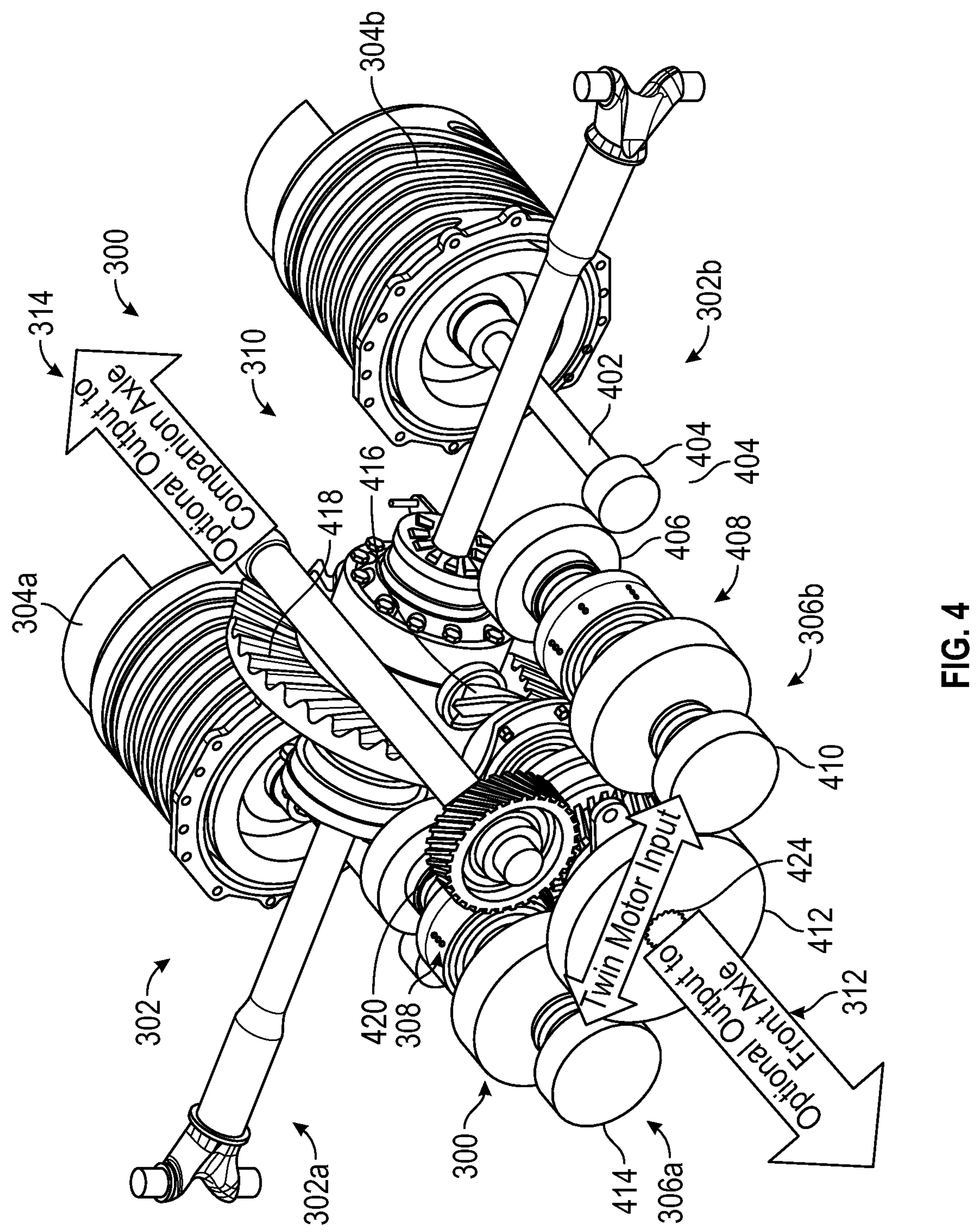
FIG. 4 is a perspective view of the electric axle of FIG. 3, according to some embodiments.

Referring now to FIG. 4, the electric axle 300 is shown with additional structural details, according to some embodiments. The electric axle 300 may be the first rear axle 202*b* of the commercial vehicle 10. It should be understood that though some components on only one side of FIG. 4 are labeled (e.g., components coupled to the electric motor 304*b*), equivalent components are present on the opposite side as well. The motor 304*b* may include an output shaft 402 coupled to an output gear 404. The output gear 404 may be coupled to and configured to drive an input gear 406 of the gear assembly 306*b*. The gear assembly 306*b* may include additional components 408, such as planetary gears and synchronizers for engaging and disengaging the planetary gears from the input gear 406. The gear assembly 306*b* may include an output gear 410, which may be coupled to and configured to be driven by the input gear 406. The output gear 410 may be coupled to and configured to drive an input gear 412 of the drive differential 308. It should be understood that although FIG. 4 shows the output gear 410 of the gear assembly 306*b* and the equivalent output gear 414 of the gear assembly 306*a* coupled to the same input gear 412, the output gears 410, 414 may be coupled to separate input gears of the drive differential 308 such that the output gears 410, 414 may rotate at different speeds. The drive differential 308 may include, for example, a spider gear (e.g., coupled to output gears 410, 414 or to additional gears coupled to the output gears 410, 414) the that allows the rotational speeds of the output gears 410, 414 to differ while each electric motor 304*a*, 304*b* supplies power to the drive differential 308. Spider gear may be coupled to a ring gear such that, when one or both of the output gears 410, 414 are driven, the spider gear rotates the ring gear. Thus, the drive differential 308 may be structurally similar to a typical vehicle differential but rather than one input driving two outputs at different speeds, the drive differential 308 receives two inputs that may be at different speeds and provides a single output. The drive differential 308 includes an output pinion 416 (e.g., at the end of a driveshaft 424) that is coupled to and configured to drive a ring gear 418 of an axle differential 310. The output pinion 416 may be driven by the ring gear of the drive differential 308. The axle differential 310 may then drive the half-axles 302*a*, 302*b* at the same or different speeds depending on whether the commercial vehicle 10 is moving in a straight line or turning. The yoke 312 for connecting to the front axle 202*a* may be in line with the output pinion 416, while the yoke 314 for connecting the second rear axle 202*c* may be offset using an input gear 420 to provide clearance above or below the axle differential 310. In some embodiments, the axle 302 may be an independent axle (e.g., with an independent suspension for each wheel 22). This may reduce vibration on the electric motors 304*a*, 304*b* and make them easier to install. If the independent axle 302 is the first rear axle 202*b*, the second rear axle 202*c* may be a beam axle with a solid axle suspension. The rotation axes of the motors 304*a*, 304*b* may be substantially parallel to each other and to the longitudinal axis of the driveshaft 424 and may be substantially perpendicular to a longitudinal axis of the axle 302 (e.g., perpendicular to a plane containing the longitudinal axis of the axle 302).

The gear assemblies 306*a*, 306*b* are configured to increase torque in low-speed operation. For example, when accelerating from a stop, the commercial vehicle 10 may require a large amount of torque to turn the axle 302. The gear assemblies 306*a*, 306*b* allow the electric motors 304*a*, 304*b* to operate at higher speeds to provide high-speed inputs that are geared down to lower rotation speeds and higher torque by gears (e.g., planetary gears). Thus, the gear assemblies 306*a*, 306*b* may multiply the input torque from the electric motors 304*a*, 304*b* when the commercial vehicle 10 is accelerating at low speeds. However, at high vehicle speeds, the planetary gears of the gear assembly 306*a*, 306*b* may not be necessary because higher output speeds and lower output torque are required. Rather than spinning disengaged planetary gears, the planetary gears may be completely disconnected from the drive train. This may improve efficiency by reducing windage losses.

Figure 5:
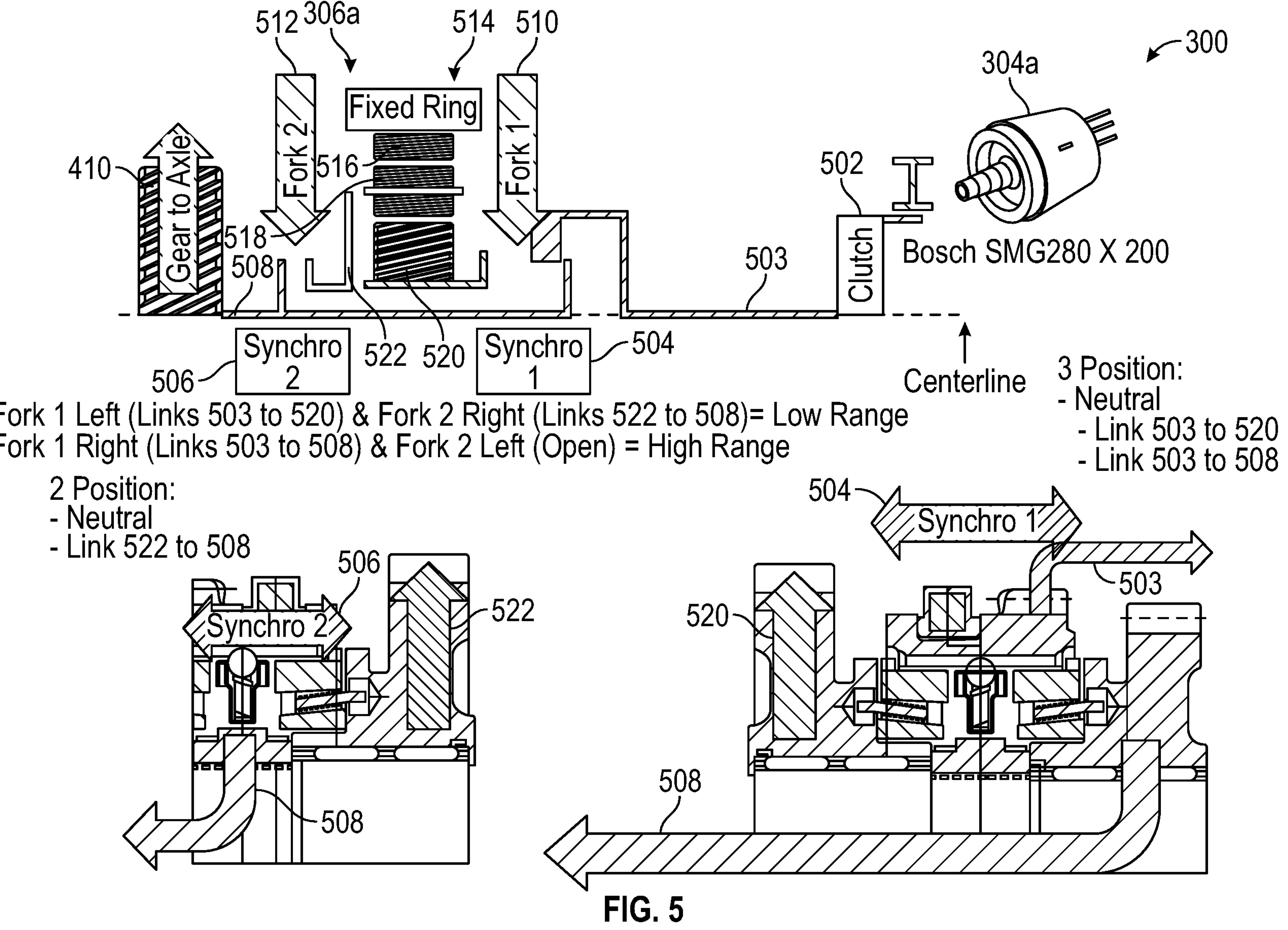
FIG. 5 is a schematic diagram of the electric axle of FIG. 3 including a gear assembly, according to some embodiments.

Referring now to FIG. 5, a diagram of the electric axle 300 is shown to illustrate the functionality of the gear assembly 306*a*, 306*b*, according to some embodiments. For simplicity, only half of one planetary gear assembly (e.g., gear assembly 306*a*) is shown. The electric motor 304*a* may be selectively coupled to a first member 503 of the gear assembly 306*a* via a clutch 502. The clutch 502 may disengage the electric motor 304*a* from the gear assembly 306*a* when gears of the gear assembly 306*a* are being engaged and disengaged. The gear assembly 306*a* may include a first synchronizer 504 (e.g., a synchromesh) configured to control a first fork 510 and a second synchronizer 506 configured to control a second fork 512. The gear assembly 306*a* includes a planetary gearset 514, including a fixed ring gear 516, planet gears 518, and a sun gear 520. Torque is output via the output gear 410 to the axle 302 (e.g., via the differentials 308, 310). During low-speed, high-torque operation of the commercial vehicle 10 (e.g., accelerating from a stop), the first synchronizer 504 may move the first fork 510 to a first position to couple the electric motor 304*a* to the sun gear 520. At the same time, the second synchronizer 506 may move the second fork to a first position to couple a carrier 522 coupled to the planet gears 518 to the output gear 410. To switch to high-speed, low-torque operation, the first synchronizer 504 may move the first fork 510 to a second position to couple the electric motor 304*a* to a direct drive shaft 508 not coupled to the planetary gearset 514. At the same time, the second synchronizer 506 may move the second fork 512 to a neutral position disengaged from the carrier 522 coupled to the planet gears 518 and the output gear 410. With the first fork 510 in the second position in the second fork 512 in the neutral position, the planetary gearset 514 is completely disconnected and decoupled from the electric motor 304*a* and the drive differential 308 and does not spin. This may reduce windage losses compared to a system in which the entire gearset 514 rotates with the planet gears 518 locked in position relative to the sun gear 520 and the outer ring gear 516, improving efficiency at high vehicle speeds. The first fork 510 may also have a neutral position in which neither the sun gear 520 nor the direct drive shaft 508 are connected to the electric motor 304*a*.

Gear Shifting

Figure 6:
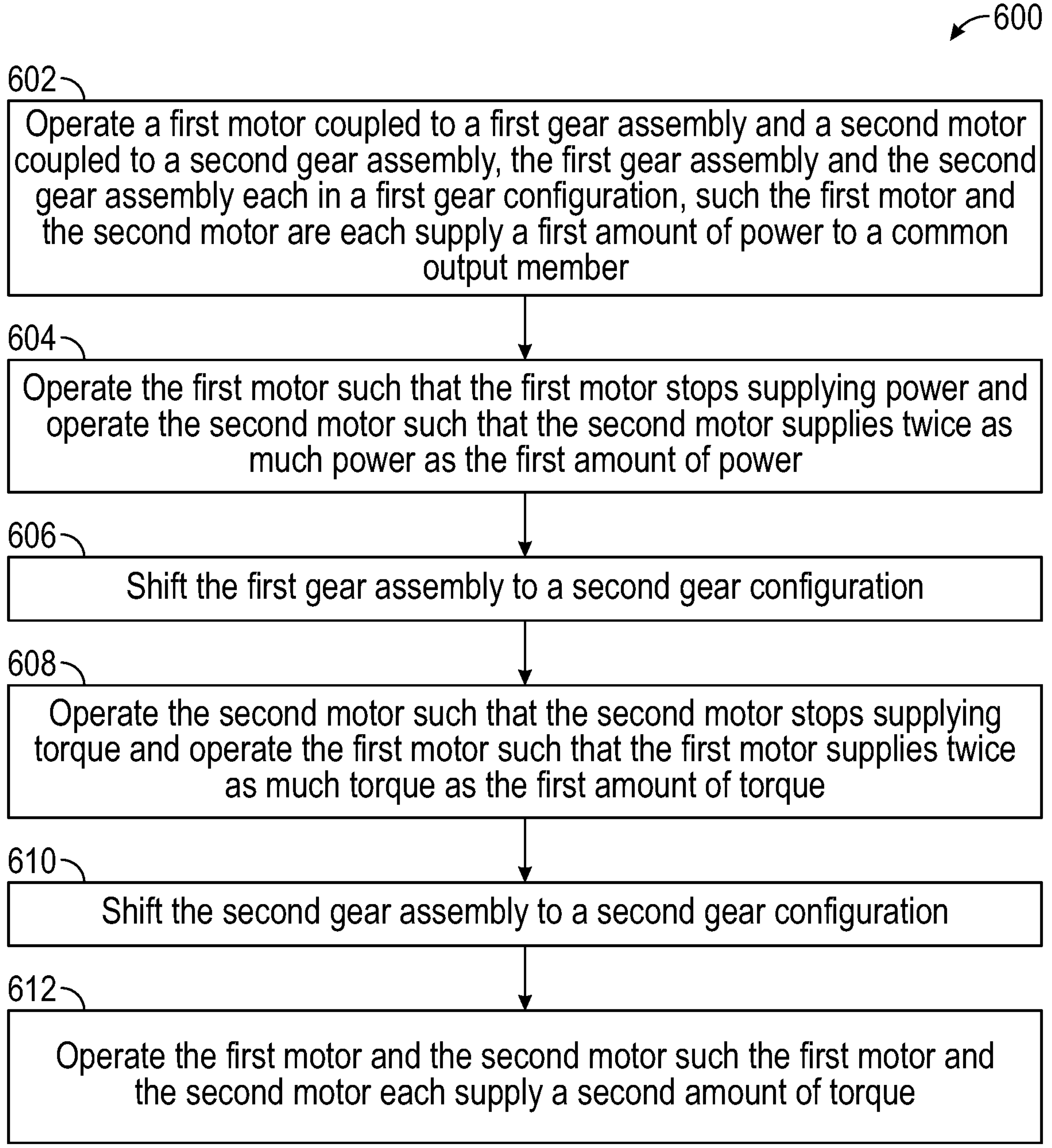
FIG. 6 is a flow diagram of a process for shifting gears in the vehicle of FIG. 1 using the gear assembly of FIG. 5, according to some embodiments.

Referring now to FIG. 6, the method 600 is shown for shifting gears in a vehicle (e.g., the commercial vehicle 10) that includes two motors (e.g., the two electric motors 304*a*, 304*b* in the electric axle 300) powering one common output member (e.g., the output pinion 416), according to some embodiments. Using multiple electric motors may allow for smoother and more efficient gear shifting without losing power. At operation 602 of the method 600, a first motor coupled to a first gear assembly and a second motor coupled to the second gear assembly are operated such that the first motor and the second motor each supply an equal, first amount of power to the common output member, wherein the first gear assembly and the second gear assembly are each in a first gear configuration. For example, in the electric axle 300, the first electric motor 304*a* may be coupled to the first gear assembly 306*a* and the second electric motor 304*b* may be coupled to the second gear assembly 306*b*. The gear assembly 306*a*, 306*b* may each be in a first configuration in which the planetary gearset 514 is engaged such that the torque supplied by the electric motors 304*a*, 304*b* is multiplied and the speed is reduced. The first configuration may be used when the commercial vehicle 10 is accelerating at low speeds.

At operation 604 of the method 600, the first motor may be operated such that the first motor stops supplying power while the second motor is operated such that the second motor applies twice as much power as the first amount of power. For example, the second motor may supply the same amount of power that the first and second motors supplied collectively in operation 602. Thus, the same power may continue to be supplied to the common output member even while the first motor stops supplying power. There may be a small drop or increase in power during the transition, however, the power supplied to the common output member may remain substantially constant. If a second motor is unable to supply this much power, the second motor may supply as much power as it is capable of supplying. Thus, there may be some drop in power when the first motor stops supplying power, but the drop may be reduced by increasing the power supplied by the second motor. In the electric axle 300, the first electric motor 304*a* may be operated to stop supplying power to its output shaft 402. The clutch 502 may also be disengaged from the gear assembly 306*a*. Both forks 510, 512 may be moved into the neutral position. At the same time, the second electric motor 304*b* is operated at double the power, such that the second electric motor 304*b* makes up for the power no longer being supplied from the first electric motor 304*a*. Thus, a substantially constant supply of torque can be supplied to the output pinion 416 while the first electric motor 304*a* is not supplying any power and may be disengaged entirely from the drive differential 308.

At operation 606 of the method 600, the first gear assembly may be shifted to a second gear configuration. The second gear configuration may include a lower gear ratio or may be a direct drive configuration in which the gear assembly is disengaged. The second gear configuration may allow for higher output speeds and lower output torques to move the vehicle at higher speeds. In the electric axle 300, the gear assembly 306*a* may be controlled such that the first fork 510 couples the electric motor 304*a* to the direct drive shaft 508 and the second fork 512 decouples from the carrier 522 and moves to the neutral position. In the second configuration, the electric motor 304*a* may directly drive the output gear 410, and the planetary gearset 514 may be disconnected. The output gear 410 may thus be driven at high speeds, but the torque supplied by the electric motor 304*a* is not multiplied by the planetary gearset 514.

At operation 608 of the method 600, the second motor may be operated such that the second motor stops supplying power while the first motor is operated such that the first motor supplies twice as much power is the first amount of torque. For example, the first motor may supply the same amount of power that the second motor supplied in operation 604. Thus, the same power may continue to be supplied to the output member even while the second motor stops supplying power. If the first motor is unable to supply this much power, the first motor may supply as much power as it is capable of supplying. Thus, there may be some drop in power when the second motor stops supplying power, but the drop may be reduced by increasing the power supplied by the first motor. In the electric axle 300, the second electric motor 304*b* may be operated to stop supplying power to its output shaft. The clutch 502 may also be disengaged from the gear assembly 306*b*. Both forks 510, 512 may be moved into the neutral position. At the same time, the first electric motor 304*a* is operated at double the power, such that the first electric motor 304*a* makes up for the lost power from the second electric motor 304*b*. Thus, a substantially constant supply of power can be supplied to the output pinion 416 while the second electric motor 304*b* is not supplying any power and may be disengaged entirely from the drive differential 308.

At operation 610 of the method 600, the second gear assembly may be shifted to a second gear configuration, which may be the same gear configuration to which the first gear assembly has been shifted. The second gear configuration may include a lower gear ratio or may be a direct drive configuration. The second gear configuration may allow for higher output speeds and lower output torques to move the vehicle at higher speeds. In the electric axle 300, the second gear assembly 306*b* may be controlled such that the first fork 510 couples the electric motor 304*b* to the direct drive shaft 508 and the second fork 512 decouples from the carrier 522 and moves to the neutral position. In the second configuration, the electric motor 304*b* may directly drive the output gear 414, and the planetary gearset 514 is disconnected. The output gear 410 may be driven at high speeds, but the torque supplied by the electric motor 304*b* is not multiplied by the planetary gearset 514.

At operation 612 of the method 600, the first motor and the second motor may be operated such that the first motor and the second motor each supply a substantially equal, second amount of power. The second amount of power may be the same as or different than the first amount of power. In the electric axle 300, once the second gear assembly 306*b* has been shifted into the second configuration and the clutch 502 has reengaged the second motor 304*b* with the direct drive shaft 508 of the second gear assembly 306*b*, the second motor 304*b* may be controlled to begin supplying the second amount of power. The first motor 304*a* may also be controlled to supply the second amount of power, which may be a reduction in power from its previous state in which it was producing twice the amount of power as the first amount of power. With the first motor 304*a* and the second motor 304*b* each supplying the second amount of power, the motors 304*a*, 304*b* again share the load to turn the axle 302 of the commercial vehicle 10. At operation 612, each of the motors 304*a*, 403*b* has been shifted to the second configuration in which the planetary gearset 514 is disengaged, and the output shaft of each motor 304*a*, 403*b* is coupled to a respective direct drive shaft 508. In this configuration, the commercial vehicle 10 may operate at high speeds and relatively low torque. When the motors 304*a*, 304*b* are each coupled to the direct drive shaft 508, the motors 304*a*, 304*b* may operate at a lower speed than when the planetary gearset 514 is engaged.

The method 600 may be particularly useful when multiple axles are coupled together, for example, via the yokes 312, 314. Because the output from the motors (e.g., motors 304*a*, 304*b*) can be split between multiple axles (e.g., the first rear axle 202*b* and the second rear axle 202*c*), an increase in power from one of the motors is split between the axles rather than applied to a single axle. If each axle were powered by a separate motor, doubling the power supplied by one of the motors at a constant speed would double the torque on a single axle, which could cause the wheels to slip and/or could destabilize the vehicle. When two motors are used to collectively power two axles, each axle continues to receive the same torque when one motor stops supplying power and the other doubles its output power. Similarly, if each wheel of an axle had its own motor, doubling the power of one motor while supplying no power from the other motor, could cause the powered wheel to slip and/or the vehicle to turn. The arrangement described above ensures that, when the two axles are coupled together, the power supplied by the motors is distributed to the two half-axles of each of the two axles.

It should be understood that in some embodiments, the first motor 304*a* and the second motor 304*b* may not provide an exactly equal amount of power at operation 602 or operation 612. For example, the first motor 304*a* may provide 10 percent, 20 percent, or 30 percent more or less power than the second motor. Further, as discussed above, each motor may not be capable of supplying enough power to replace the power supplied by both motors 304*a*, 304*b* at operation 602 when the other motor stops supplying power. Instead, each motor may increase its output power, for example, to its respective maximum output power, when the other motor stops supplying power. Thus at operation 602, the first motor 304*a* may supply a first amount of power and the second motor 304*b* may supply a second amount of power. At operation 604, the first motor 304*a* may stop supplying power and the second motor 304*b* may supply a third amount of power that is greater than the second amount of power. At operation 608, the second motor 304*b* may stop supplying power and the first motor 304*a* may supply a fourth amount of power that is greater than the first amount of power. Finally, at operation 612, the first motor 304*a* may supply a fifth amount of power and the second motor 304*b* may supply a sixth amount of power. In some embodiments, the fifth amount of power may be substantially equal to the first amount of power and the sixth amount of power may be substantially equal to the second amount of power. The gear assemblies 306*a*, 306*b* may also not be identical to one another. For example, the planetary gearsets 514 of each gear assembly 306*a*, 306*b* may include different gear ratios. At operation 606, the first gear assembly 306*a* may shift to a second gear configuration, and at operation 610 the second gear assembly 306*b* may shift to a third gear configuration.

The operation of the method 600 may be controlled by a controller that automatically determines when the method should be performed. For example, the controller may determine, based on the speed and torque being output by the motors, that the gear assemblies should be shifted to the second configuration. In some embodiments, the controller may shift the gear assemblies in response to a user input, for example, from a button, switch, or selector in the cab 14 of the vehicle 10. The controller can, for example, send signals to clutch 502 to disengage and reengage with the gear assemblies 306*a*, 306*b*, or to the synchronizers 504, 506 to move the respective forks 510, 512 to switch between gear configurations. The controller may include a processing circuit including at least one processor and at least one memory. The at least one processing circuit can be communicably connected with a communications interface of the controller such that the processing circuit and the various components thereof can send and receive data (e.g., data from the motors, user inputs, synchronizer commands, etc.) via the communications interface. The at least one processor can be implemented as a general purpose processor, an application specific integrated circuit (ASIC), one or more field programmable gate arrays (FPGAs), a group of processing components, or other suitable electronic processing components.

The at least one memory (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. The memory can be or include volatile memory or non-volatile memory. The at least one memory can include database components, object code components, script components, or any other type of information structure for supporting the various activities and information structures described in the present application. According to some embodiments, the at least one memory is communicably connected to the processor through the processing circuit and includes computer code for executing (e.g., by a processing circuit and/or a processor) one or more processes described herein. In some embodiments, the controller is implemented within a single computer (e.g., one server, one housing, etc.). In various other embodiments, the controller can be distributed across multiple servers or computers (e.g., that can exist in distributed locations).

Vehicles with Power Takeoff

Figure 7:
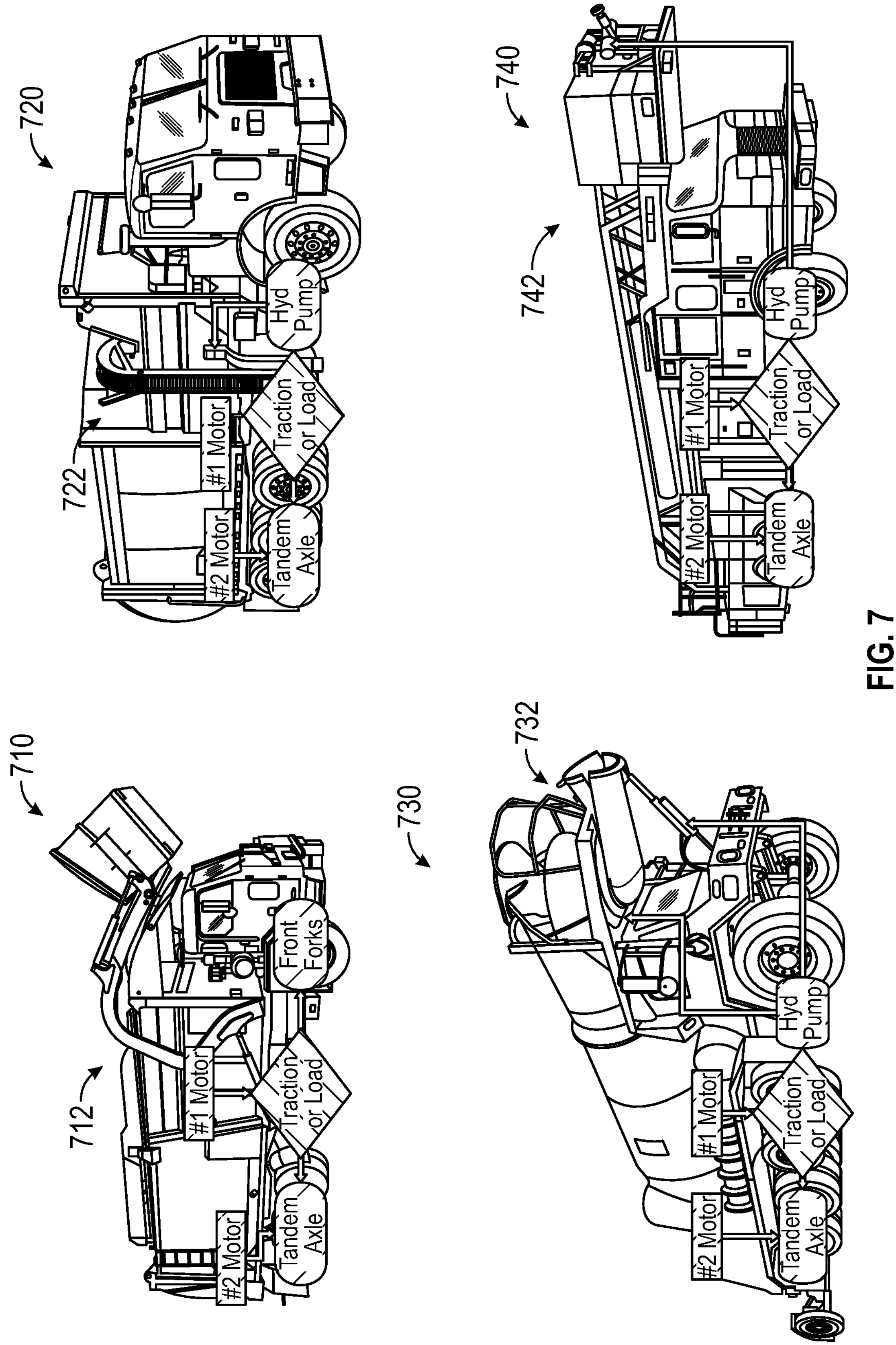
FIG. 7 is a collection of side views of various commercial vehicles, each including a power takeoff, according to some embodiments.

Referring now to FIG. 7, commercial vehicles 710, 720, 730, 740 are shown, according to some embodiments. Each vehicle 710, 720, 730, 740 may include a traction motor (e.g., similar to the motors 304*a*, 304*b*) for powering the tractive elements to move the vehicle that also includes a power takeoff that can be used to power auxiliary components of the vehicle 710, 720, 730, 740. The output shaft of the motor can be decoupled from the axles when the vehicle 710, 720, 730, 740 is not moving, for example, by disengaging the clutch 502, so that the motor can power the auxiliary components without moving the vehicle 710, 720, 730, 740. The power takeoff may also include a similar clutch to couple and decouple the motor from the auxiliary components. Vehicle 710 is shown as a front-load refuse vehicle. The motor may be used, via the power takeoff, to power the front forks assembly 712 to lift a dumpster above the vehicle and dump the contents in to the refuse compartment. In some embodiments, the power takeoff may power a packer of the vehicle 712 to compact the contents of the refuse compartment. In some embodiments, power may be mechanically transferred from the motor to the auxiliary components, while in other embodiments, the motor may be used to power a hydraulic pump to pressurize a hydraulic system that can be used to power the auxiliary components. The vehicle 720 is shown a side-load refuse vehicle. The motor may be used, via the power takeoff, to power a side arm loader 722 that is configured to lift a refuse can and dump the contents in to the refuse compartment of the vehicle 720. As discussed above, the power takeoff may be coupled to a hydraulic pump, and a hydraulic system may be used to power the auxiliary components of the vehicle 720. Additional auxiliary components that may be powered by the hydraulic system include a tailgate, a top door, a packer, a front fork, loader and a front arm loader. The vehicle 730 is shown as a front-discharge mixer. The motor may be used, via the power takeoff, to power a discharge chute 732, either mechanically or hydraulically. The vehicle 740 is shown as a ladder truck. The motor may be used, via the power takeoff, to power a hydraulic pump that can be used to extend the ladder 742. By including a power takeoff in one or more of the traction motors, a separate, additional motor may not be required to power auxiliary components of the vehicle.

Axle Configurations

Figure 8:
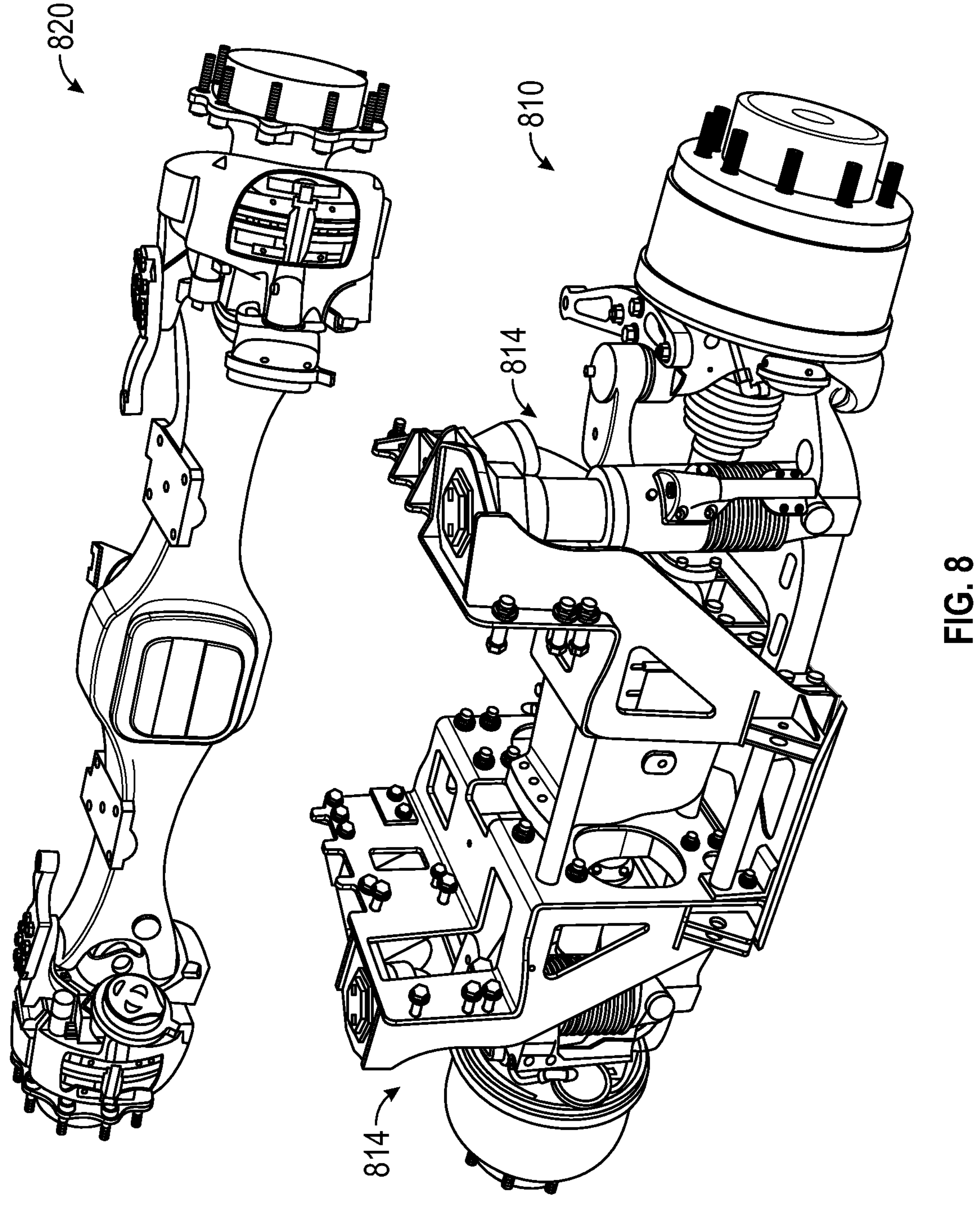
FIG. 8 is a perspective view of two axles of a tandem axle assembly, according to some embodiments.

Referring now to FIGS. 8-19, various tandem axle arrangements are shown, according to some embodiments. As shown in FIG. 8, in some embodiments, one of the rear axles of a vehicle (e.g., of the rear axles 202*b*, 202*c* of the vehicle 10) may be an independent axle 810 and the other may be a beam axle 820. The motors (e.g., motors 304*a*, 304*b*) may each be coupled to the independent axle 810, which may provide several advantages. First, because the motors 304*a*, 304*b* are coupled to the independent axle 810, the independent suspension 814 for each wheel can reduce the vibration and side loading on the motors 304*a*, 304*b* and the differential (e.g., the axle differential 310) that may be caused by bumpy roads. Further, because the motors 304*a*, 304*b* are separated from the road by the independent suspension, the unsprung weight is reduced, which can improve handling and allow for a smoother ride. The independent axle 810 may also allow for better ground contact by the tires. The suspension for the beam axle 820 may be positioned between the axle and the frame of the vehicle, so motors mounted to the beam axle 820 may not be separated from the wheels by an additional suspension.

Figure 9:
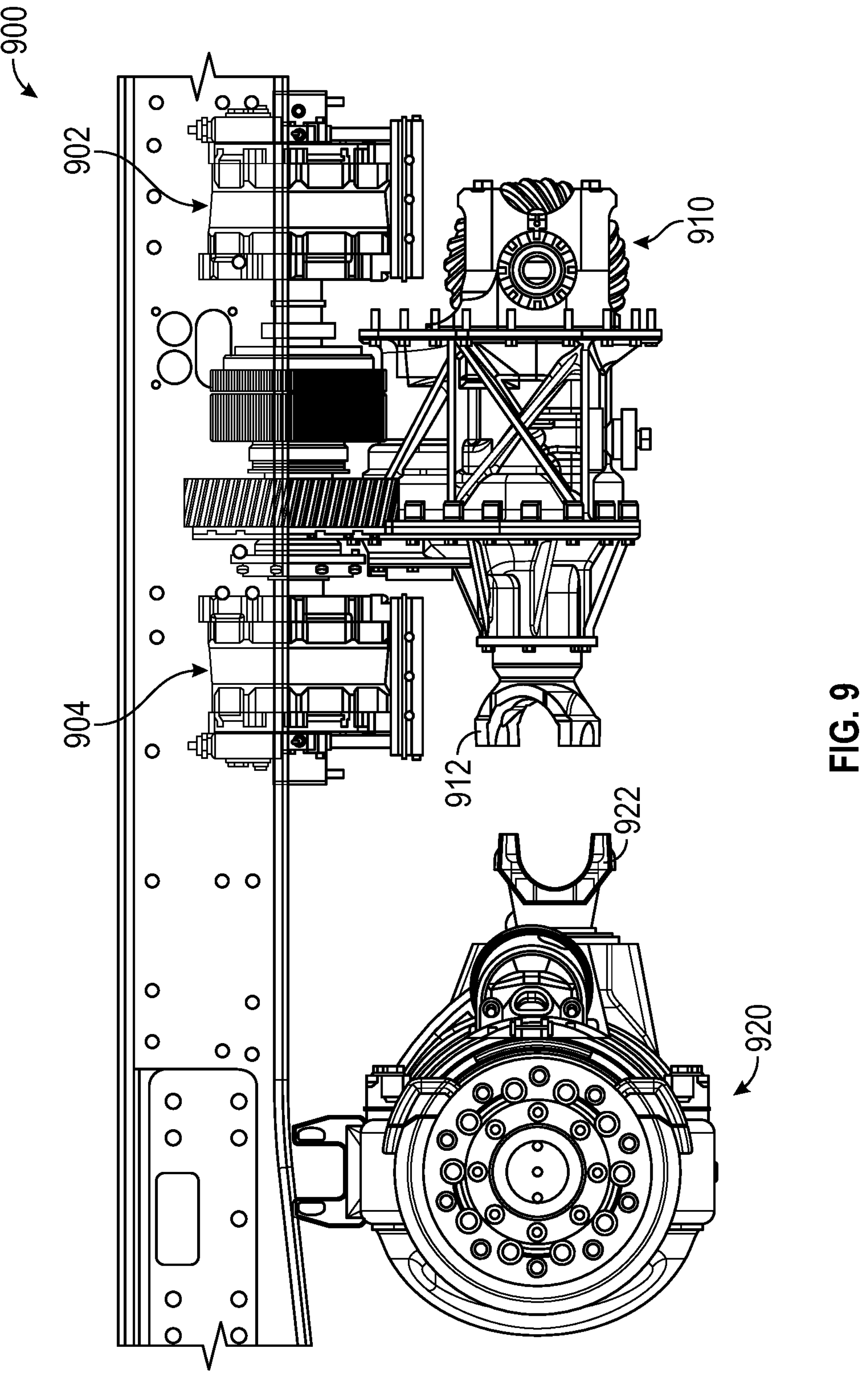
FIG. 9 is a side view of a tandem axle assembly, according to some embodiments.

FIG. 9 shows a tandem axle assembly 900 that includes two motors 902, 904 coupled together and mounted on an independent axle 910, according to some embodiments. A yoke 912 of the independent axle 910 may be coupled to a yoke 922 of a beam axle 920 so that the motors 902, 904 can be used to drive the beam axle 920, in addition to the independent axle. In the embodiment shown, the motors 902, 904 are coupled together to jointly power the axles 910, 920, which may improve the quality and speed of gear shifting and may require fewer components than other embodiments. In some embodiments, the tandem axle assembly 900 may include an infinitely (e.g., continuously) variable transmission.

Figure 10:
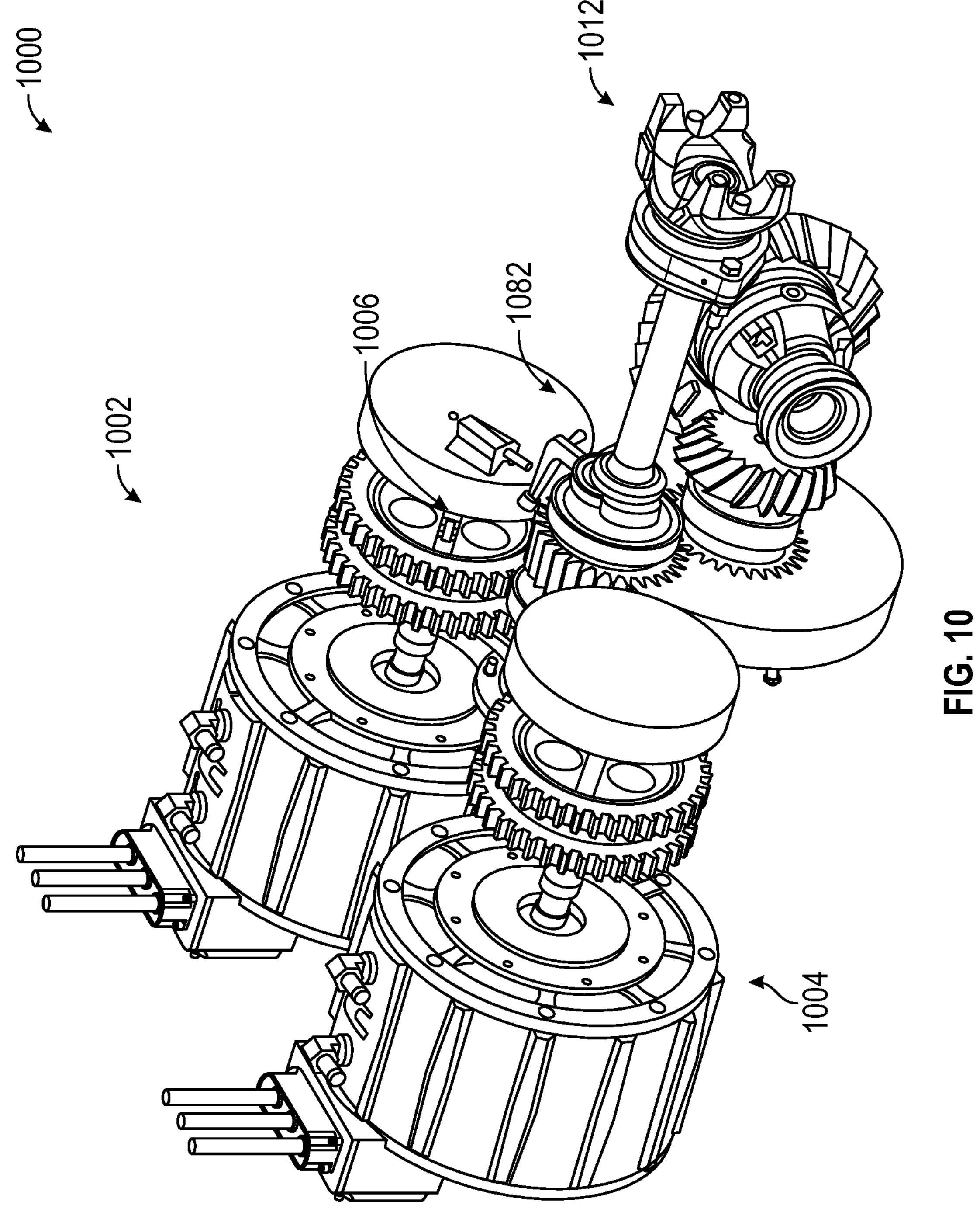
FIG. 10 is a perspective view of a portion of a tandem axle assembly, according to some embodiments.

FIG. 10 shows a portion of a tandem axle assembly 1000, according to some embodiments. The tandem axle assembly may include two motors 1002, 1004 coupled to an independent axle (not shown) and including a yoke 1012 that may be coupled to a beam axle or another independent axle. The motors 1002, 1004, may be independent from one another and coupled via a differential 1006, which drive a driveshaft 1008, as described with reference to FIGS. 3-5. The motors 1002, 1004, may each be separately and independently mounted to the chassis 12 of the vehicle 10. The rotation axes of the motors 1002, 1004 may be substantially parallel to each other and to the longitudinal axis of the driveshaft and may be substantially perpendicular to a longitudinal axis of the axle (e.g., perpendicular to a plane containing the longitudinal axis of the axle).

Figure 11:
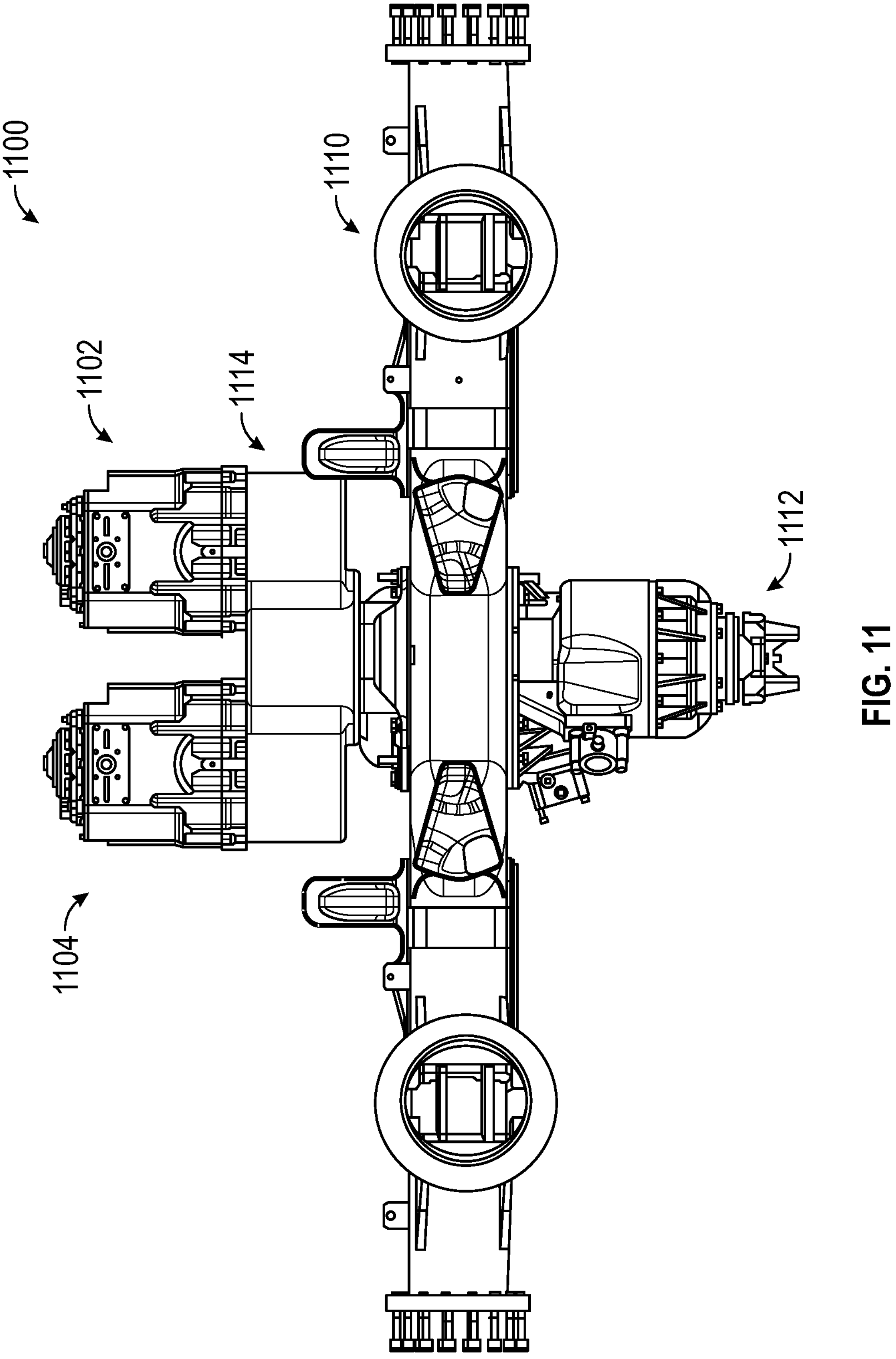
FIG. 11 is a top view of an electric axle, according to some embodiments.

FIG. 11 shows a portion of a tandem axle assembly 1100 that includes two motors 1102, 1104 coupled to a motor housing 1114 fixedly coupled to a beam axle 1110, according to some embodiments. A yoke 1112 may be coupled to another beam axle so that the motors 1102, 1104 can be used to drive the other beam axle, in addition to the first beam axle 1110. This arrangement may be less expensive than the other embodiments discussed above, but may increase the unsprung weight on the vehicle, which may reduce the handling ability of the vehicle and/or make the ride less smooth. The motors 1102, 1104 may also experience additional vibration and side load, as there is no suspension between the wheels and the motor. The motors 1102, 1104, may be independent from one another and coupled via a differential, as described with reference to FIGS. 3-5.

Figure 12:
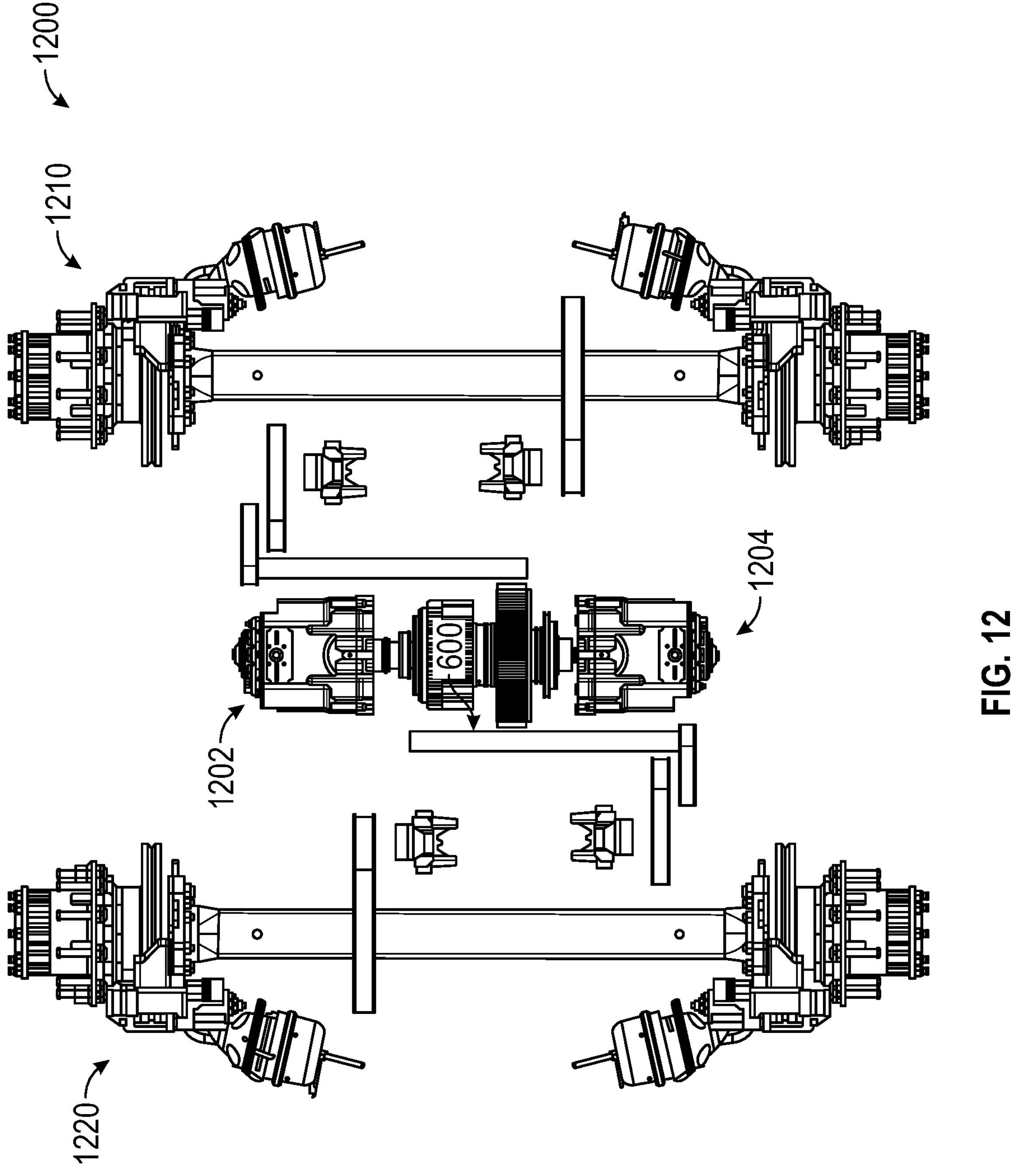
FIG. 12 is a top view of a tandem axle assembly, according to some embodiments.

FIG. 12 shows a portion of a tandem axle assembly 1200 that includes two transversely mounted motors 1202, 1204 coupled together and mounted between two beam axles 1210, 1220 according to some embodiments. The motors 1202, 1204 may jointly power both of the beam axles 1210, 1220. The motors may be coupled together, similar to the motors 902, 904 of the tandem axle assembly 900, and the tandem axle assembly 1200 may include an infinitely (e.g., continuously) variable transmission. The tandem axle assembly 1200, may require a larger distance between the axles 1210, 1220 than required in other arrangements.

Figure 13:
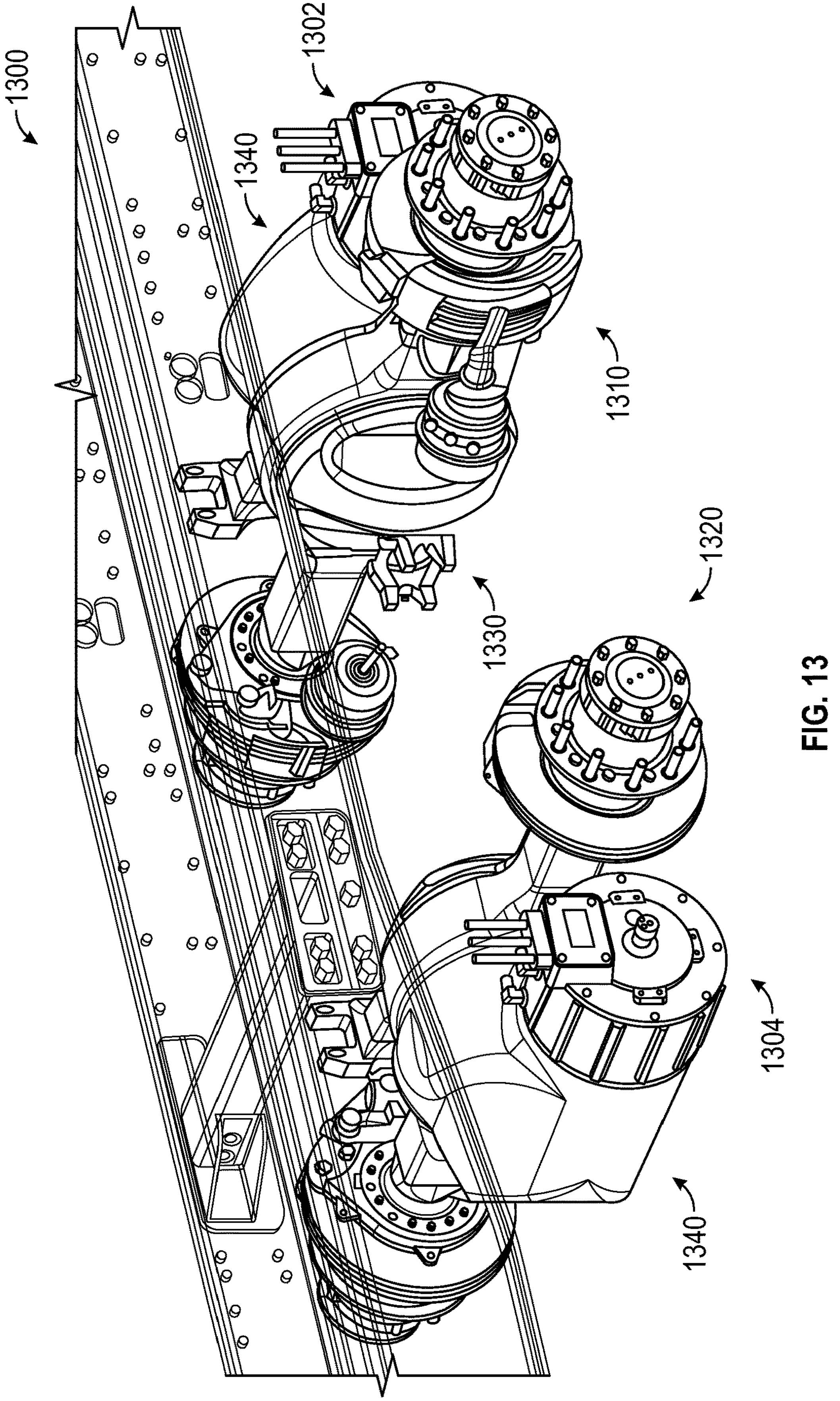
FIG. 13 is a perspective view of a tandem axle assembly, according to some embodiments.

FIG. 13 shows a tandem axle assembly 1300 that includes two beam axles 1310, 1320, each with a transversely mounted motor 1302, 1304 coupled thereto. Each axle 1310, 1320 may include a yoke 1330 so that the axles 1310, 1320 may be coupled together and be jointly powered by the motors 1302, 1304. The yokes 1330 may be coupled via one or more central gearboxes 1340 so that the motors 1302, 1304 may operate independently, for example, as described with reference to FIGS. 3-5.

Figure 14:
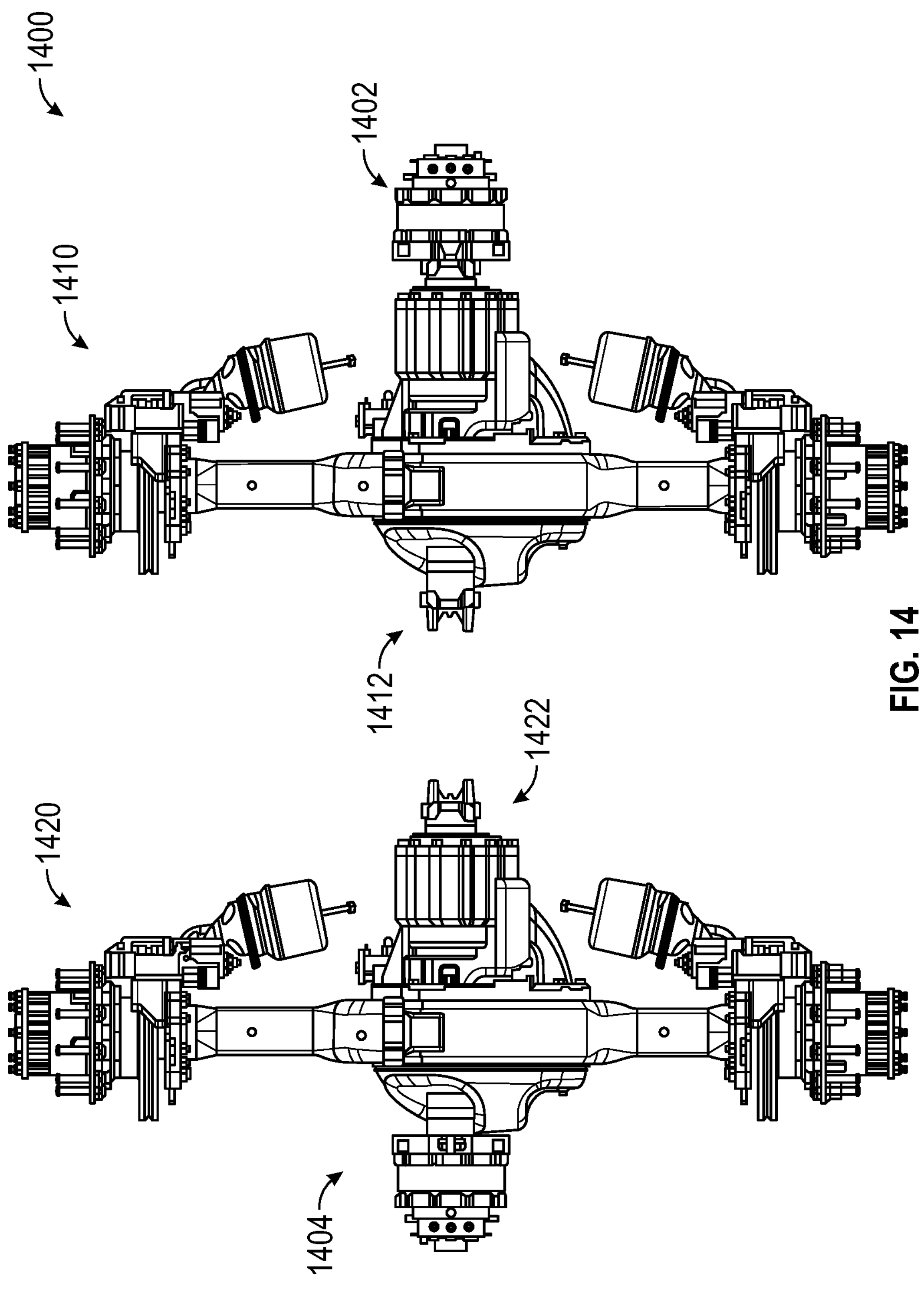
FIG. 14 is a top view of a tandem axle assembly, according to some embodiments.
Figure 15:
FIG. 15 is a side view of a tandem axle assembly, according to some embodiments.
Figure 15:
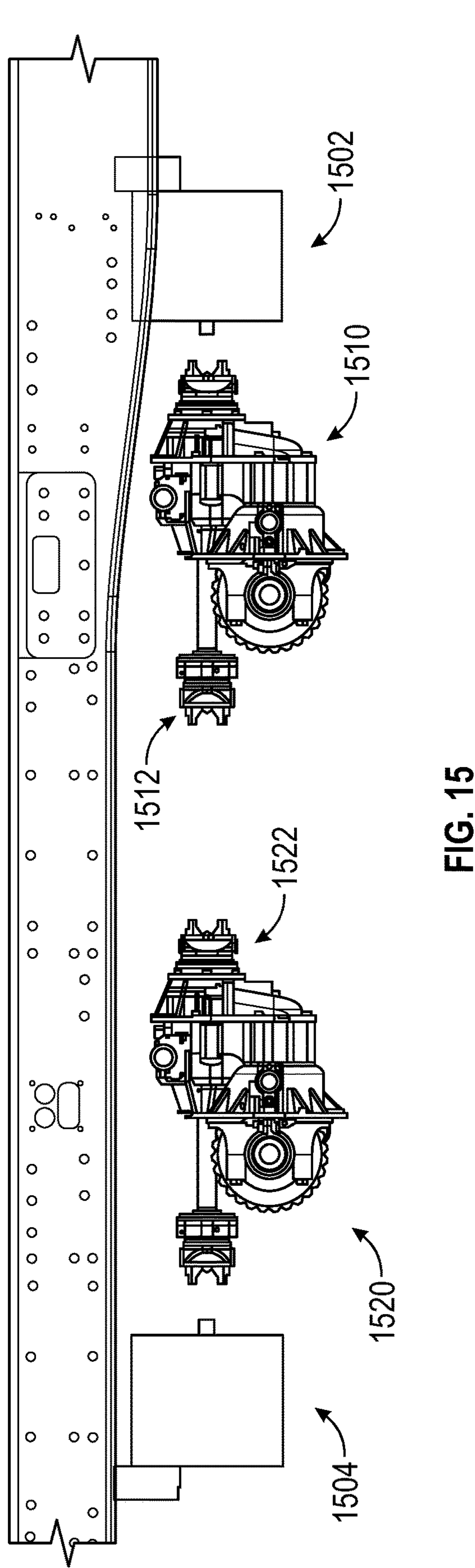

FIG. 14 shows a tandem axle assembly 1400 that includes two beam axles 1410, 1420, each with a motor 1402, 1404 coupled thereto. The motors 1402, 1404 may be mounted directly to the axles 1410, 1420 and coupled together via yokes 1412, 1422. FIG. 15 shows a tandem axle assembly 1500 with a similar arrangement to the tandem axle assembly 1400, except that the motors 1502, 1504, are mounted remotely from the axles 1510, 1520. For example, the motors 1502, 1504 may be mounted to the frame of the vehicle. The axles 1510, 1520 are coupled together via the yokes 1512, 1522 to share power from the motors. This arrangement may provide additional protection for the motors and reduce the unsprung weight as compared to the tandem axle assembly 1400.

Figure 16:
FIG. 16 is a perspective view of an electric axle, according to some embodiments.
Figure 16:
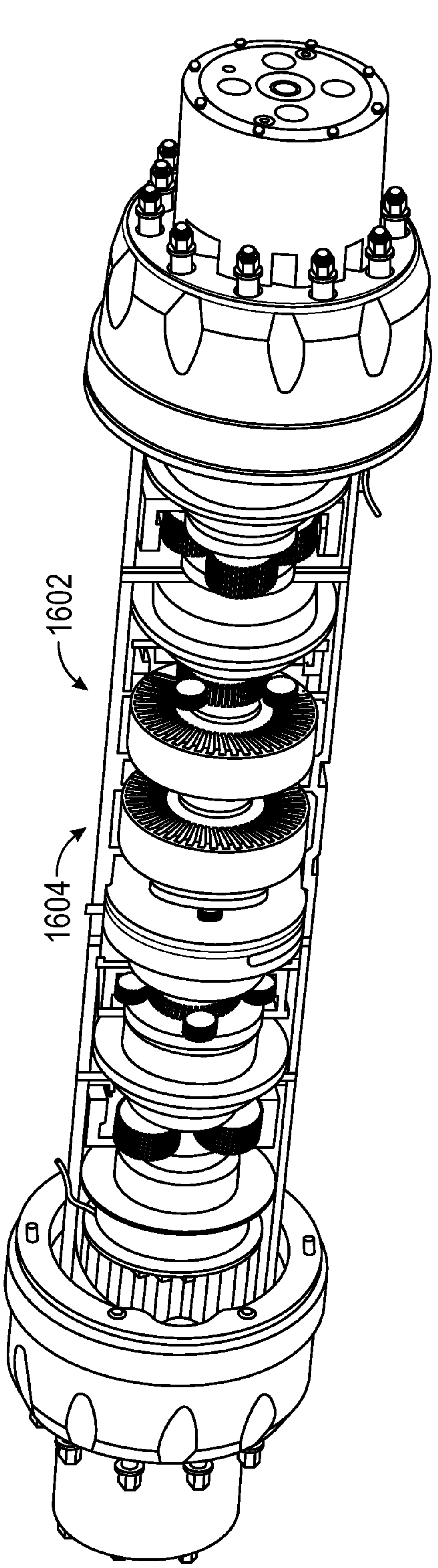
Figure 17:
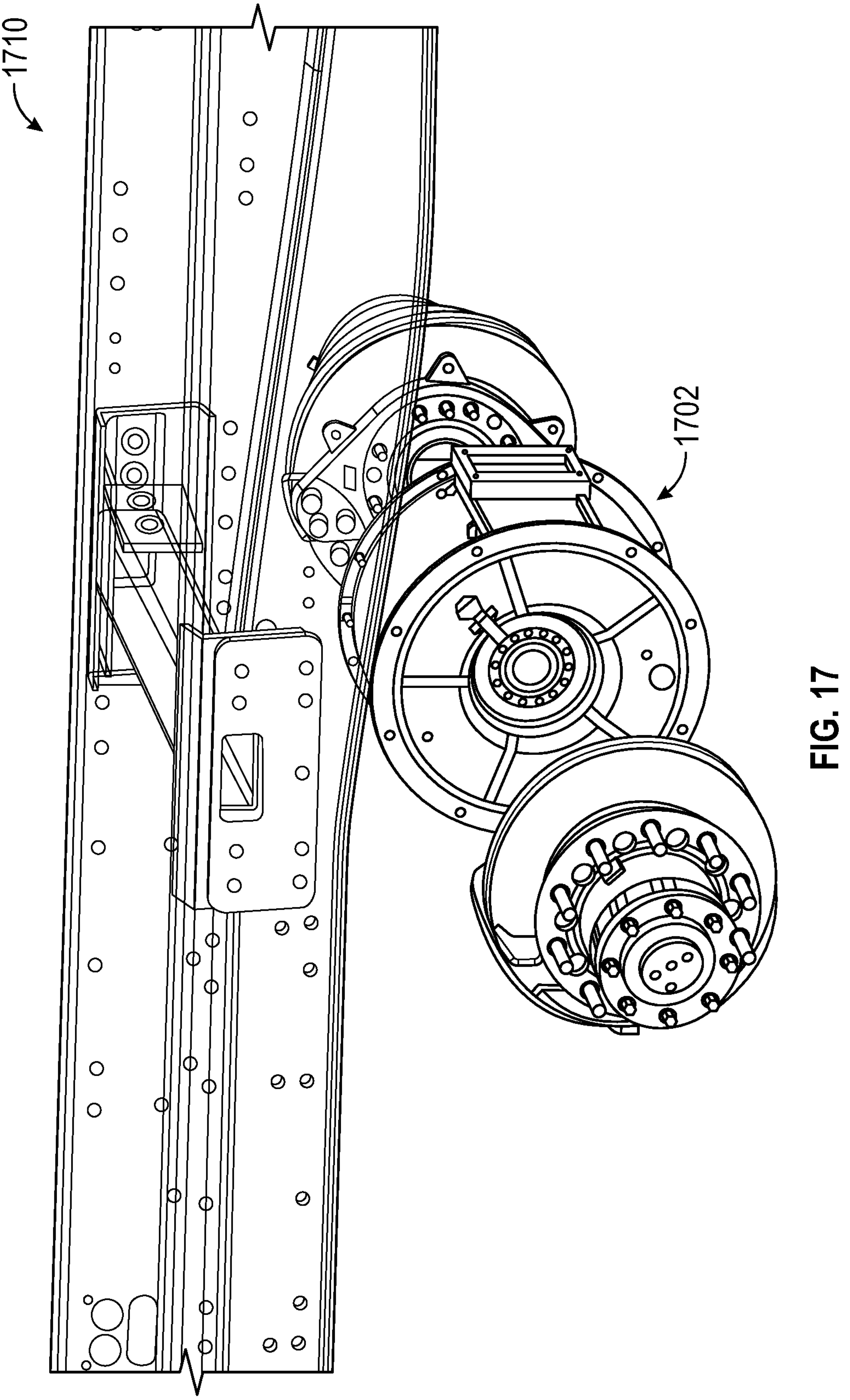
FIG. 17 is a perspective view of an electric axle, according to some embodiments.
Figure 18:
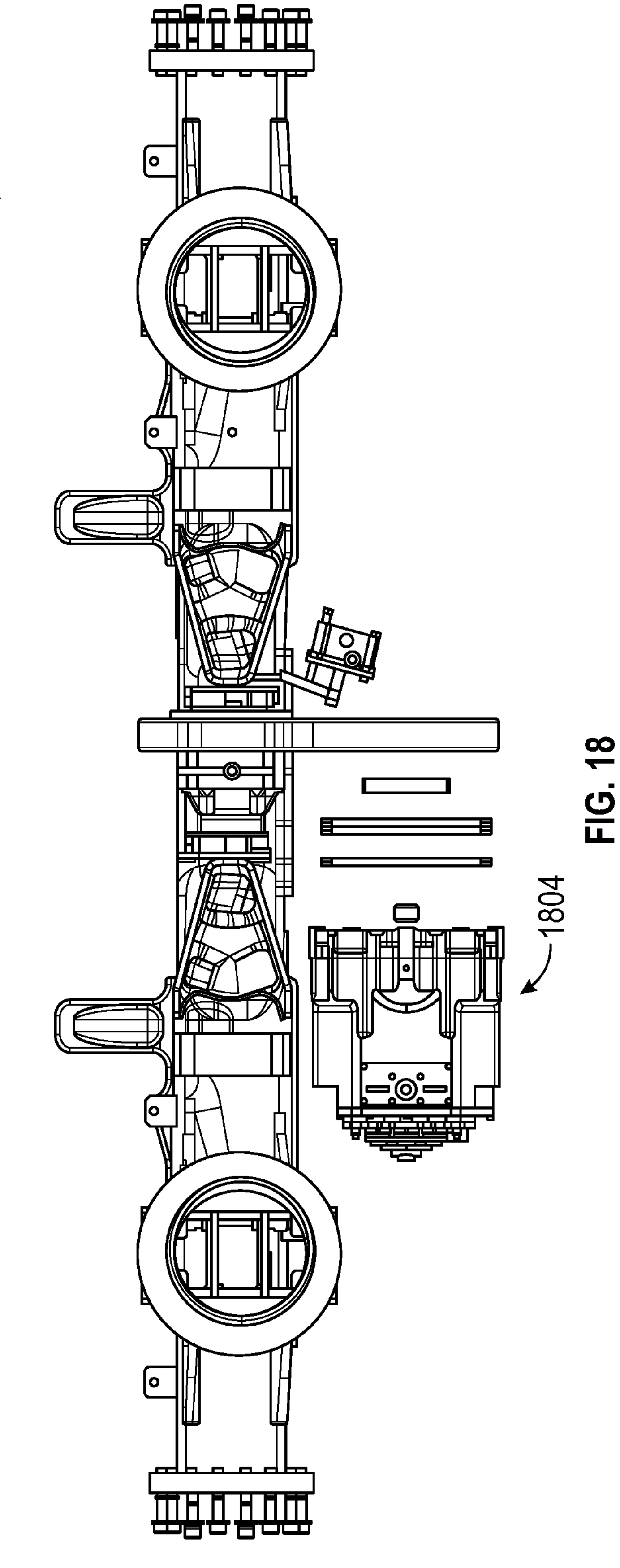
FIG. 18 is a top view of an electric axle, according to some embodiments.

FIG. 16 shows a beam axle 1610 including two motors 1602, 1604 configured to jointly power the axle 1610. In some embodiments, one or more axles of the vehicle may be arranged similarly to the beam axle 1610, with no connections between axles. Each axle may be independently powered by the motors 1602, 1604. This arrangement allows for a very compact design but does not provide the advantages of the interconnected axles described above. FIG. 17 shows an independent axle 1710 including a single motor 1702. In some embodiments, one or more axles of the vehicle may be arranged similarly to the independent axle 1710, with no connections between axles. This arrangement provides the advantages of an independent axle as described above (e.g., reduced unsprung weight). However, as each axle is independently powered by its own motor, rather than the axles being interconnected, this arrangement does not provide the advantages of the interconnected axles described above. FIG. 18 shows a beam axle 1810 including a transversely mounted motor 1802 configured to power the axle 1810. In some embodiments, one or more axles of the vehicle may be arranged similarly to the beam axle 1810, with no connections between axles. In some embodiments, a second motor may be coupled to the first motor 1802 to provide additional power. As each axle is independently powered by its own motor or motors, rather than the axles being interconnected, this arrangement does not provide the advantages of the interconnected axles described above.

Figure 19:
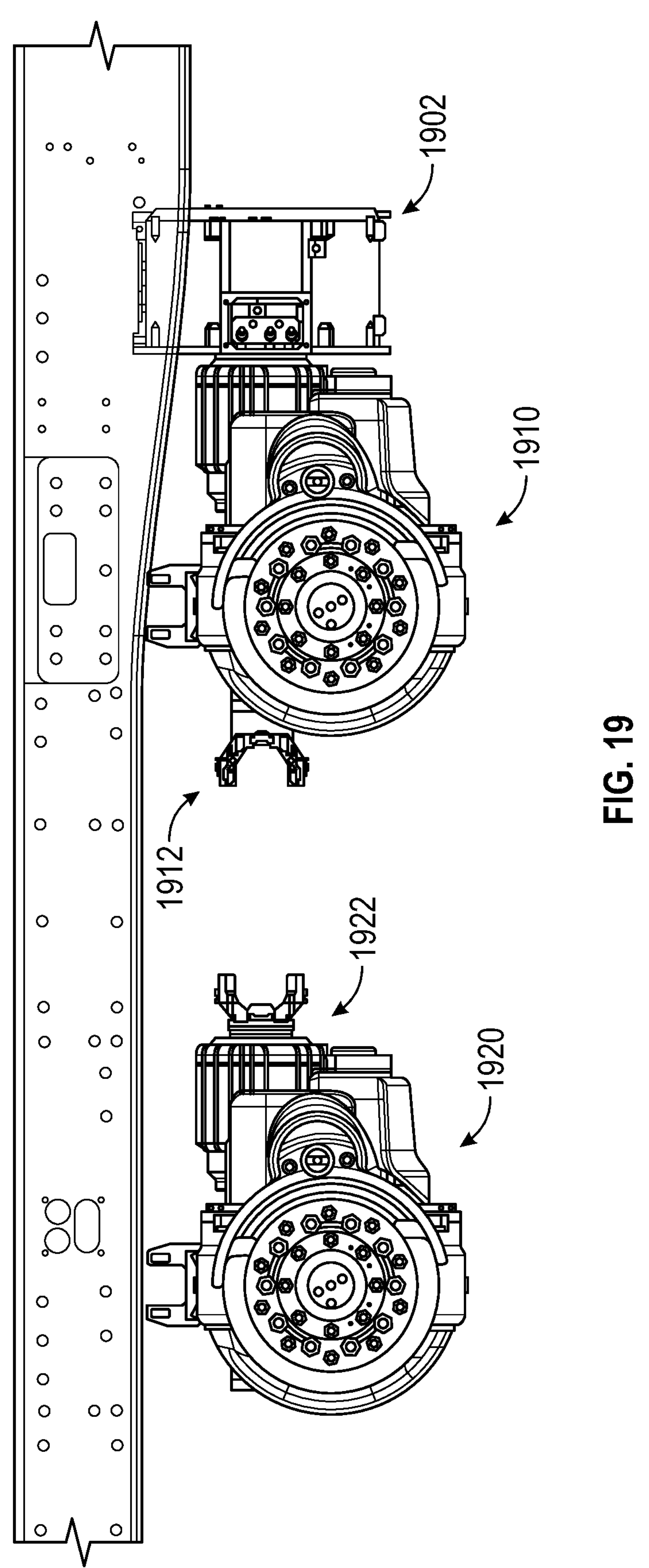
FIG. 19 is a side view of a tandem axle assembly, according to some embodiments.

FIG. 19 shows a tandem axle assembly 1900 that includes two beam axles 1910, 1920, with a motor 1902 coupled to one of the beam axles 1910. The motor 1902 may be mounted directly to the axle 1910 or mounted remotely from the axle 1910 (e.g., mounted to the vehicle frame). The axles 1910, 1920 may be coupled together via yokes 1912, 1922. This arrangement may provide the advantages of sharing power between axles but does not allow for the use of the shifting method 600 which may provide smoother shifting using multiple motors.

Configuration of Exemplary Embodiments

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A vehicle comprising:

a chassis; and an electric axle assembly coupled to the chassis, the electric axle assembly comprising:

a first electric motor;

a second electric motor;

a drive differential configured to combine a first input torque from the first electric motor and a second input torque from the second electric motor and to drive an output shaft using the combined torque;

a first axle coupled to a first tractive element configured to be driven by the output shaft to propel the vehicle;

a second tractive element positioned on an opposite side of the electric axle assembly from the first tractive element; and an axle differential coupled to and configured to be driven by the output shaft, the axle differential coupled to and configured to drive the first tractive element and the second tractive element.

2. The vehicle of claim 1, wherein the first axle is an independent axle and the first tractive element and the second tractive element each includes an independent suspension.

3. The vehicle of claim 1, further comprising:

a second axle comprising a third tractive element; and a first yoke coupled to and configured to be driven by the drive differential, the first yoke configured to be coupled to the second axle to drive the third tractive element.

4. The vehicle of claim 1, wherein the first electric motor and the second electric motor are separately mounted to the chassis.

5. The vehicle of claim 1, wherein the drive differential is configured to receive the first input torque at a first motor speed and the second input torque at a second motor speed different than the first motor speed.

6. The vehicle of claim 5, wherein the first axle is a beam axle.

7. The vehicle of claim 1, wherein the electric axle assembly further comprises a motor housing fixedly coupled to the first axle, wherein the first electric motor and the second electric motor are each coupled to the motor housing.

8. The vehicle of claim 1, wherein a rotation axis of the first electric motor is substantially perpendicular to a longitudinal axis of the first axle and substantially parallel to a longitudinal axis of the output shaft.

9. A method of shifting gears in a vehicle having a first electric traction motor coupled to a first gear assembly and a second electric traction motor coupled to a second gear assembly, the method comprising:

simultaneously operating the first electric traction motor to supply a first amount of power to the first gear assembly and operating the second electric traction motor to supply a second amount of power to the second gear assembly;

simultaneously operating the first electric traction motor to stop supplying power and operating the second electric traction motor to supply a third amount of power, the third amount of power being higher than the second amount of power;

while the first electric traction motor is not supplying power, shifting the first gear assembly from a first gear configuration to a second gear configuration;

simultaneously operating the second electric traction motor to stop supplying power and operating the first electric traction motor to supply a fourth amount of power, the fourth amount of power being greater than the first amount of power; and while the second electric traction motor is not supplying power, shifting the second gear assembly from a third gear configuration to a fourth gear configuration.

10. The method of claim 9, further comprising simultaneously operating the first electric traction motor to supply a fifth amount of power to the first gear assembly with the first gear assembly in the second gear configuration and operating the second electric traction motor to supply a sixth amount of power to the second gear assembly with the second gear assembly in the fourth gear configuration.

11. The method of claim 10, further comprising disengaging the first electric traction motor from the first gear assembly with a first clutch before shifting to the second gear configuration and disengaging the second electric traction motor from the second gear assembly with a second clutch before shifting to the fourth gear configuration.

12. The method of claim 9, wherein shifting to the second gear configuration comprises disengaging a planetary gearset of the respective gear assembly and coupling the first electric traction motor to a direct drive shaft.

13. A vehicle comprising:

a chassis; and an electric axle assembly coupled to the chassis, the electric axle assembly comprising:

an axle comprising a first tractive element on a first side of the chassis and a second tractive element on a second side of the chassis;

a first electric motor configured to drive a first output gear;

a second electric motor configured to drive a second output gear;

a drive differential comprising a spider gear configured to be driven by the first output gear and the second output gear, the spider gear coupled to and configured to drive a ring gear using a combined output torque from the first output gear and the second output gear; and an axle differential configured to receive the combined output torque from the ring gear and to divide the combined output torque to drive the first tractive element and the second tractive element.

14. The vehicle of claim 13, wherein the drive differential is configured to be driven by the first output gear and the second output gear simultaneously while the first output gear and the second output gear are rotating at different speeds.

15. The vehicle of claim 13, wherein the first electric motor and the second electric motor are each separately mounted to the chassis, wherein a shaft of the first electric motor is substantially parallel to a shaft of the second electric motor.

16. The vehicle of claim 13, wherein the axle is a beam axle comprising a motor housing fixedly coupled to the axle, wherein the first electric motor and the second electric motor are each coupled to the motor housing, wherein a shaft of the first electric motor is substantially parallel to a shaft of the second electric motor.

17. A vehicle comprising:

a chassis; and an electric axle assembly coupled to the chassis, the electric axle assembly comprising:

a first electric motor;

a second electric motor;

a drive differential configured to combine a first input torque from the first electric motor and a second input torque from the second electric motor and to drive an output shaft using the combined torque;

a first axle coupled to a first tractive element configured to be driven by the output shaft to propel the vehicle; and a first gear assembly configured to transmit the first input torque from the first electric motor to the drive differential, the first gear assembly comprising:

a first planetary gearset comprising a carrier coupled to a plurality of planet gears;

a direct drive shaft; and a first fork configured to selectively couple the first electric motor to the first planetary gearset or the direct drive shaft.

18. The vehicle of claim 17, further comprising a second fork configured to selectively couple the carrier to the direct drive shaft when the first fork couples the first electric motor to the first planetary gearset.

19. The vehicle of claim 18, wherein the first planetary gearset is configured to be completely decoupled from the first electric motor and the drive differential when the first fork couples the first electric motor to the direct drive shaft and the second fork is moved to a neutral position.

* * * * *